US012628234B2

(12) United States Patent
Guo et al.

(10) Patent No.: US 12,628,234 B2
(45) Date of Patent: May 12, 2026

(54) TECHNIQUES FOR SWITCHING BETWEEN CONFIGURED GRANT MODES

(71) Applicant: QUALCOMM Incorporated, San Diego, CA (US)

(72) Inventors: Shaozhen Guo, Beijing (CN); Xiaoxia Zhang, San Diego, CA (US); Changlong Xu, Beijing (CN); Jing Sun, San Diego, CA (US); Rajat Prakash, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 18/256,196

(22) PCT Filed: Mar. 5, 2021

(86) PCT No.: PCT/CN2021/079248
§ 371 (c)(1),
(2) Date: Jun. 6, 2023

(87) PCT Pub. No.: WO2022/183470
PCT Pub. Date: Sep. 9, 2022

(65) Prior Publication Data
US 2024/0032132 A1     Jan. 25, 2024

(51) Int. Cl.
*H04W 76/20*        (2018.01)
*H04W 72/0446*      (2023.01)
(Continued)

(52) U.S. Cl.
CPC ....... *H04W 76/20* (2018.02); *H04W 72/0446* (2013.01); *H04W 72/0453* (2013.01); *H04W 72/232* (2023.01)

(58) Field of Classification Search
CPC ............... H04W 76/20; H04W 72/232; H04W 72/0446; H04W 72/0453
See application file for complete search history.

(56) References Cited

U.S. PATENT DOCUMENTS

2015/0133184 A1* 5/2015 Sadek ............... H04W 72/1215
                                                          455/552.1
2016/0119846 A1* 4/2016 Chou .................. H04W 72/541
                                                          370/331
(Continued)

FOREIGN PATENT DOCUMENTS

CN          111436103 A      7/2020

OTHER PUBLICATIONS

"III CG Harmonization for NR-U and IIoTIURLLC in Unlicensed Controlled Environments", 3GPP TSG-RAN WG2 Meeting #113 electronic, R2-2100920, Jan. 31, 2021 (Jan. 31, 2021), 4 Pages, part 2.

(Continued)

*Primary Examiner* — Melvin C Marcelo
(74) *Attorney, Agent, or Firm* — Holland & Hart LLP/Qualcomm

(57)                ABSTRACT

Methods, systems, and devices for wireless communication at a user equipment (UE) are described. A UE may receive control signaling configuring at least a first UE operation mode and a second UE operation mode. The UE may transmit one or more uplink messages to a base station in the unlicensed radio frequency spectrum band using a first set of parameters according to the first UE operation mode. In some examples, the UE may receive a control message comprising an indication that the UE is to switch from communicating according to the first configured UE operation mode to communicating according to the second configured UE operation mode. The UE may then transmit, in response to the received indication, one or more uplink (Continued)

Receive, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band — 1605

Transmit one or more uplink messages to the base station in the unlicensed radio frequency spectrum band using the first set of parameters — 1610

Receive a control message comprising an indication that the UE is to switch from communicating according to the first configured UE operation mode to communicating according to the second configured UE operation mode — 1615

Transmit, in response to the received indication, one or more uplink messages to the base station in the unlicensed radio frequency spectrum band using the second set of parameters according to the second UE operation mode — 1620

1600 messages to the base station in the unlicensed radio fre-
quency spectrum band using a second set of parameters
according to the second UE operation mode.

30 Claims, 23 Drawing Sheets

(51) Int. Cl.
  *H04W 72/0453*    (2023.01)
  *H04W 72/232*    (2023.01)

(56)          References Cited

U.S. PATENT DOCUMENTS

| | | | |
|---|---|---|---|
| 2020/0092818 A1 | 3/2020 | Jiang et al. | |
| 2022/0225398 A1* | 7/2022 | Kuo ....................... | H04W 72/23 |
| 2022/0393794 A1* | 12/2022 | Wang ..................... | H04L 1/188 |
| 2023/0142503 A1* | 5/2023 | Lee ....................... | H04L 5/0078 |
| | | | 370/329 |
| 2023/0145818 A1* | 5/2023 | Lee ....................... | H04W 72/23 |
| | | | 370/329 |

OTHER PUBLICATIONS

International Search Report and Written Opinion—PCT/CN2021/
079248—ISA/EPO—Nov. 26, 2021.

* cited by examiner

FIG. 3

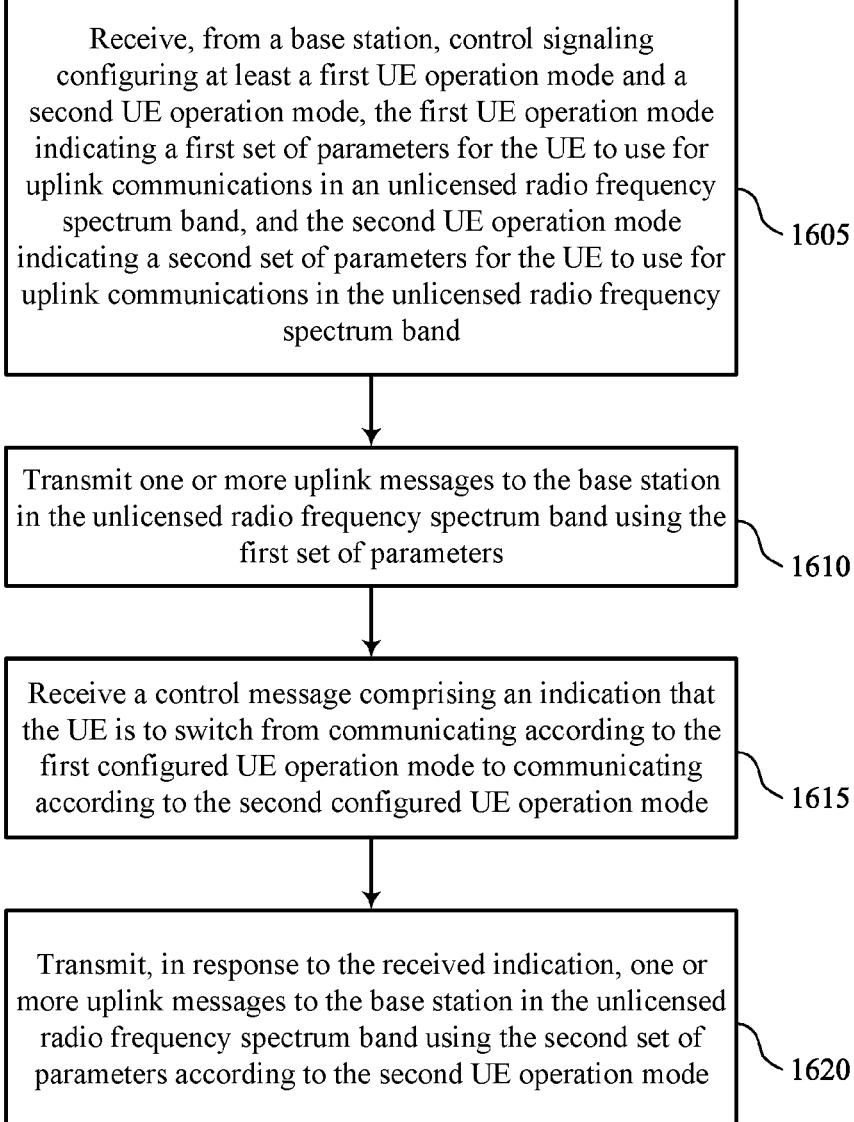

Receive, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band

1605

Transmit one or more uplink messages to the base station in the unlicensed radio frequency spectrum band using the first set of parameters

1610

Receive a control message comprising an indication that the UE is to switch from communicating according to the first configured UE operation mode to communicating according to the second configured UE operation mode

1615

Transmit, in response to the received indication, one or more uplink messages to the base station in the unlicensed radio frequency spectrum band using the second set of parameters according to the second UE operation mode

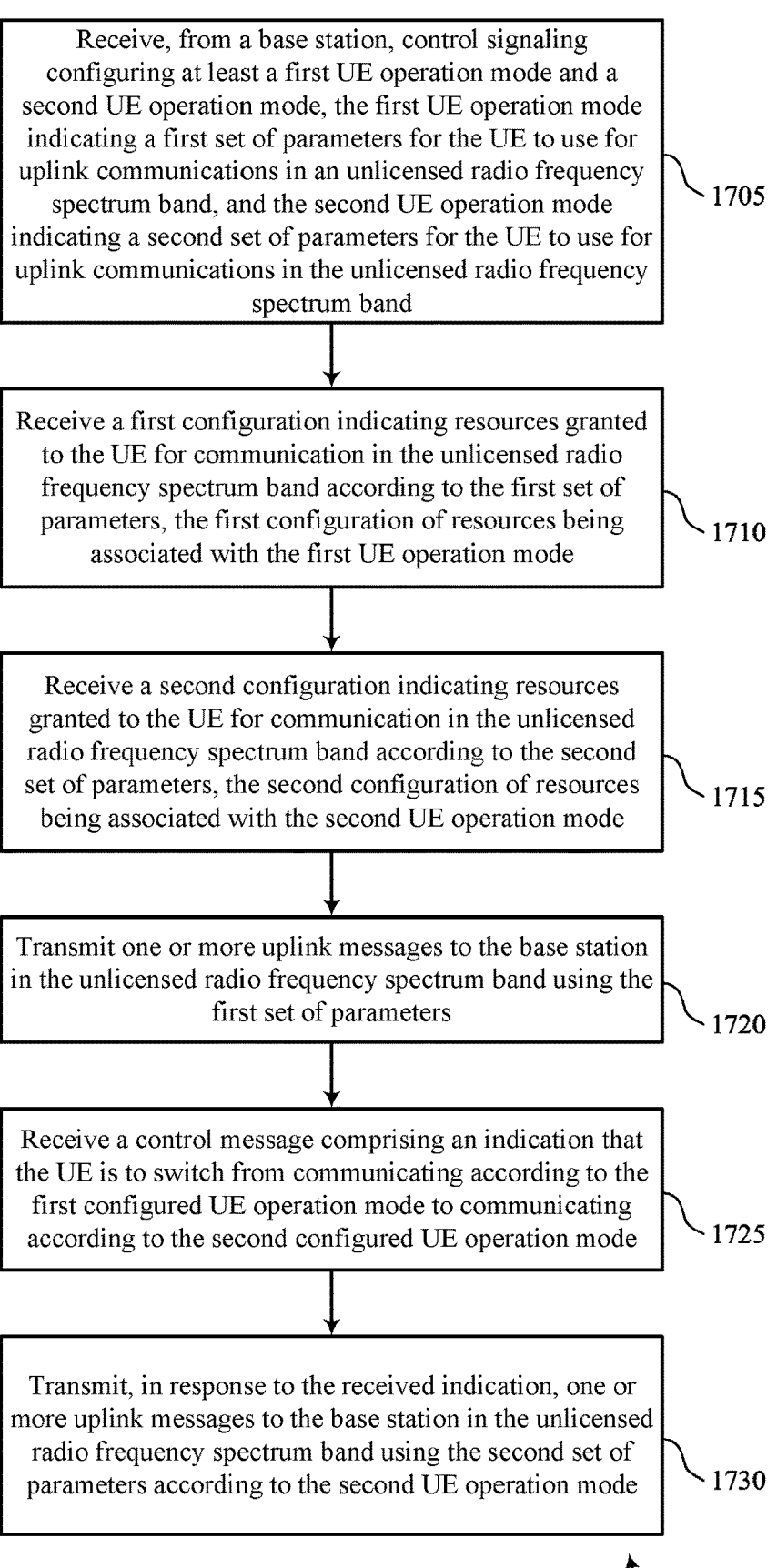

Receive, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band ⟍ 1705

Receive a first configuration indicating resources granted to the UE for communication in the unlicensed radio frequency spectrum band according to the first set of parameters, the first configuration of resources being associated with the first UE operation mode ⟍ 1710

Receive a second configuration indicating resources granted to the UE for communication in the unlicensed radio frequency spectrum band according to the second set of parameters, the second configuration of resources being associated with the second UE operation mode ⟍ 1715

Transmit one or more uplink messages to the base station in the unlicensed radio frequency spectrum band using the first set of parameters ⟍ 1720

Receive a control message comprising an indication that the UE is to switch from communicating according to the first configured UE operation mode to communicating according to the second configured UE operation mode ⟍ 1725

Transmit, in response to the received indication, one or more uplink messages to the base station in the unlicensed radio frequency spectrum band using the second set of parameters according to the second UE operation mode ⟍ 1730

FIG. 17    ⟍ 1700

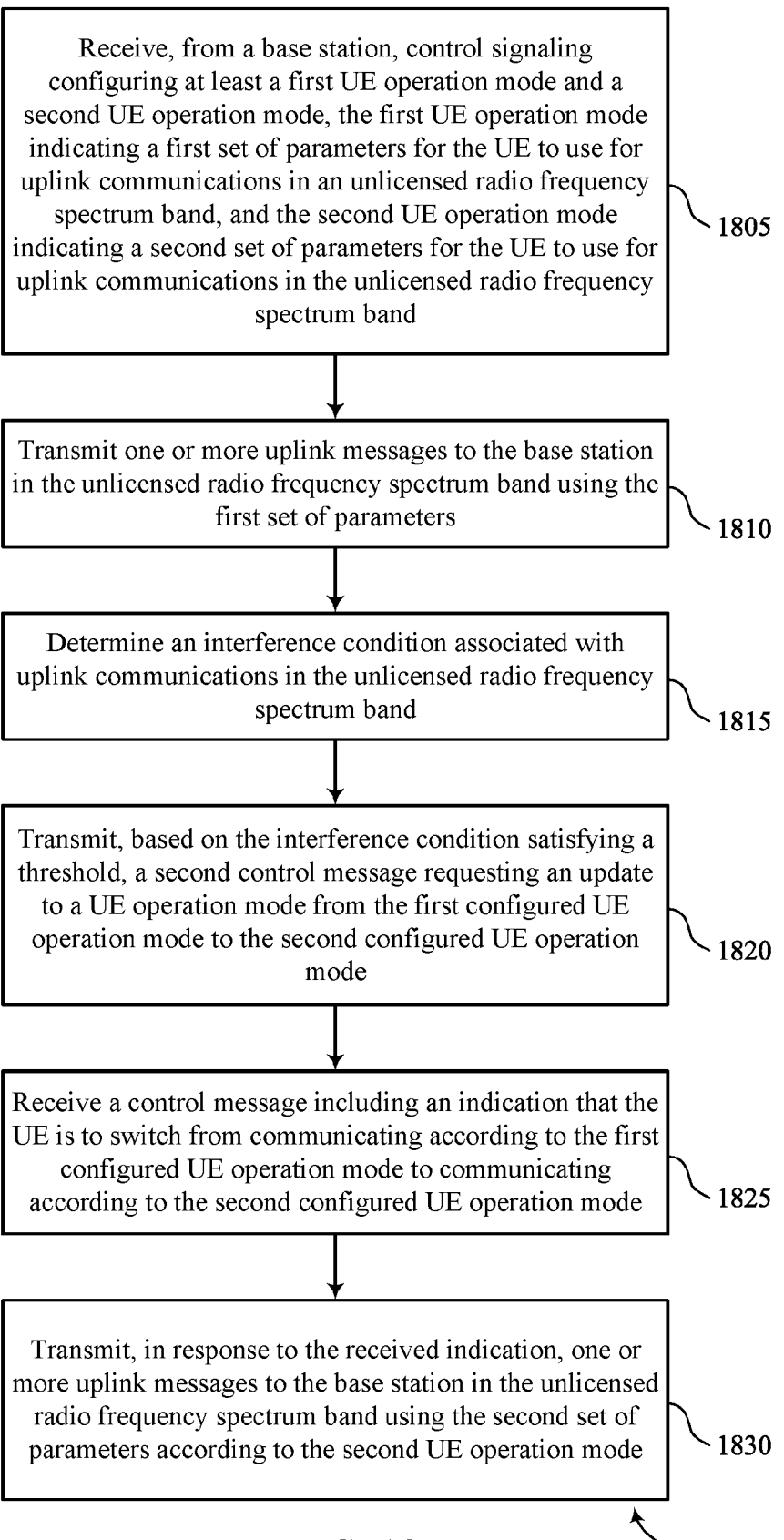

Receive, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band

1805

Transmit one or more uplink messages to the base station in the unlicensed radio frequency spectrum band using the first set of parameters

1810

Determine an interference condition associated with uplink communications in the unlicensed radio frequency spectrum band

1815

Transmit, based on the interference condition satisfying a threshold, a second control message requesting an update to a UE operation mode from the first configured UE operation mode to the second configured UE operation mode

1820

Receive a control message including an indication that the UE is to switch from communicating according to the first configured UE operation mode to communicating according to the second configured UE operation mode

1825

Transmit, in response to the received indication, one or more uplink messages to the base station in the unlicensed radio frequency spectrum band using the second set of parameters according to the second UE operation mode

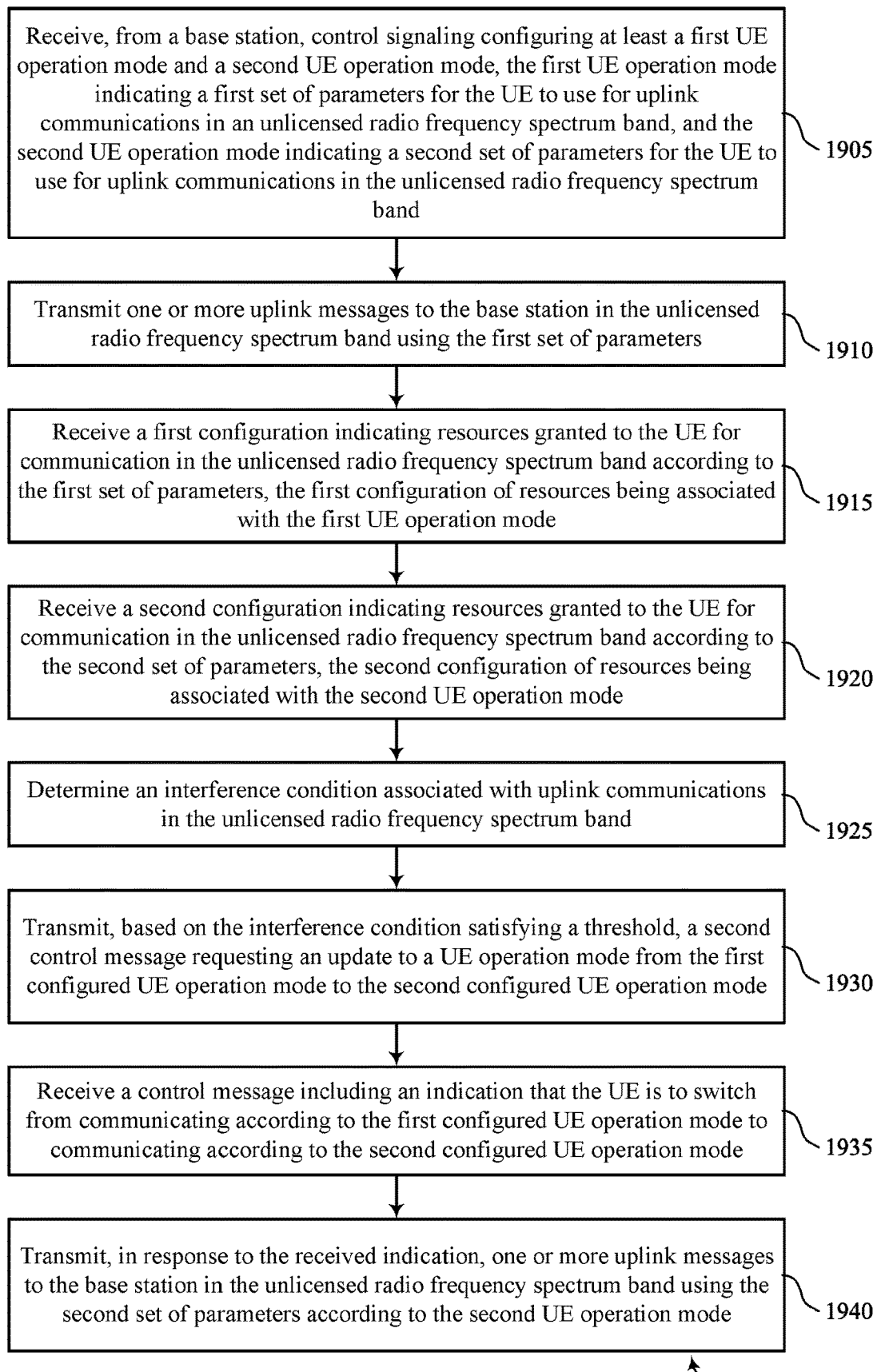

Receive, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band

1905

Transmit one or more uplink messages to the base station in the unlicensed radio frequency spectrum band using the first set of parameters

1910

Receive a first configuration indicating resources granted to the UE for communication in the unlicensed radio frequency spectrum band according to the first set of parameters, the first configuration of resources being associated with the first UE operation mode

1915

Receive a second configuration indicating resources granted to the UE for communication in the unlicensed radio frequency spectrum band according to the second set of parameters, the second configuration of resources being associated with the second UE operation mode

1920

Determine an interference condition associated with uplink communications in the unlicensed radio frequency spectrum band

1925

Transmit, based on the interference condition satisfying a threshold, a second control message requesting an update to a UE operation mode from the first configured UE operation mode to the second configured UE operation mode

1930

Receive a control message including an indication that the UE is to switch from communicating according to the first configured UE operation mode to communicating according to the second configured UE operation mode

1935

Transmit, in response to the received indication, one or more uplink messages to the base station in the unlicensed radio frequency spectrum band using the second set of parameters according to the second UE operation mode

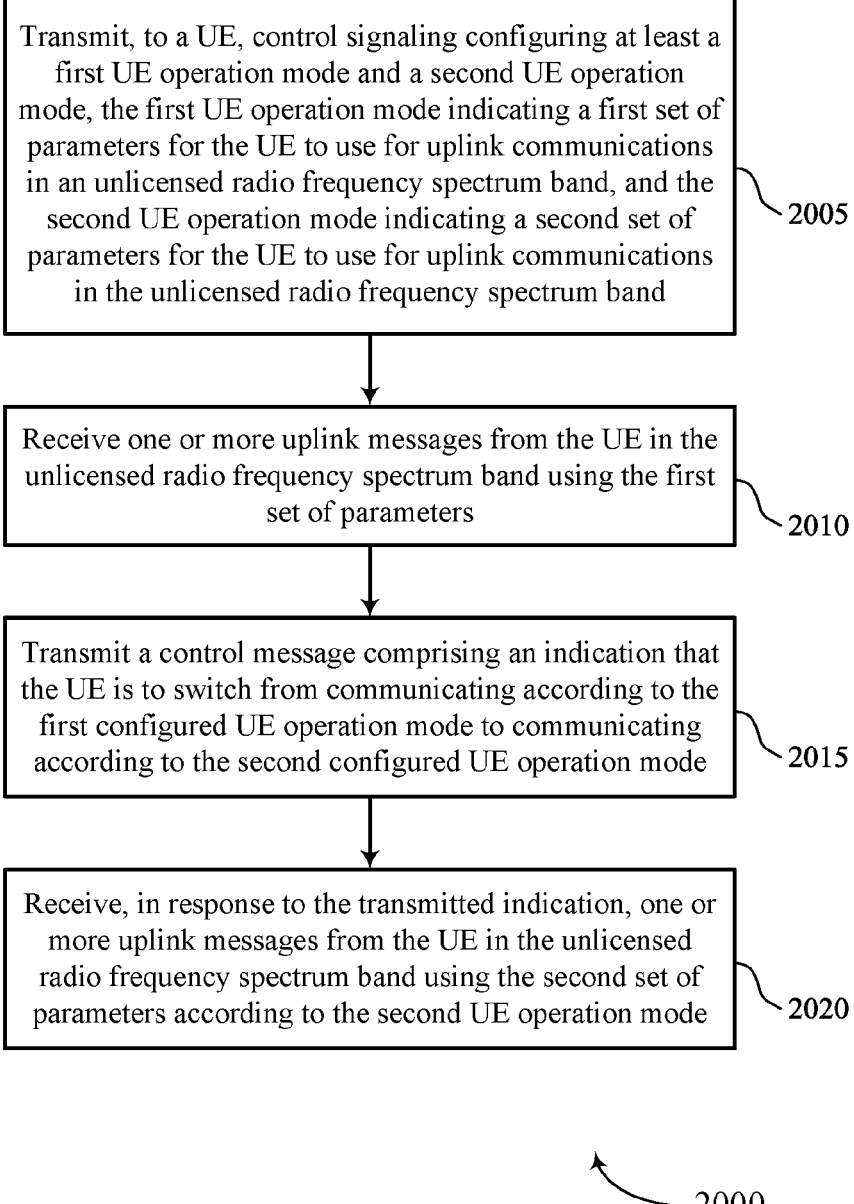

Transmit, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band

2005

Receive one or more uplink messages from the UE in the unlicensed radio frequency spectrum band using the first set of parameters

2010

Transmit a control message comprising an indication that the UE is to switch from communicating according to the first configured UE operation mode to communicating according to the second configured UE operation mode

2015

Receive, in response to the transmitted indication, one or more uplink messages from the UE in the unlicensed radio frequency spectrum band using the second set of parameters according to the second UE operation mode

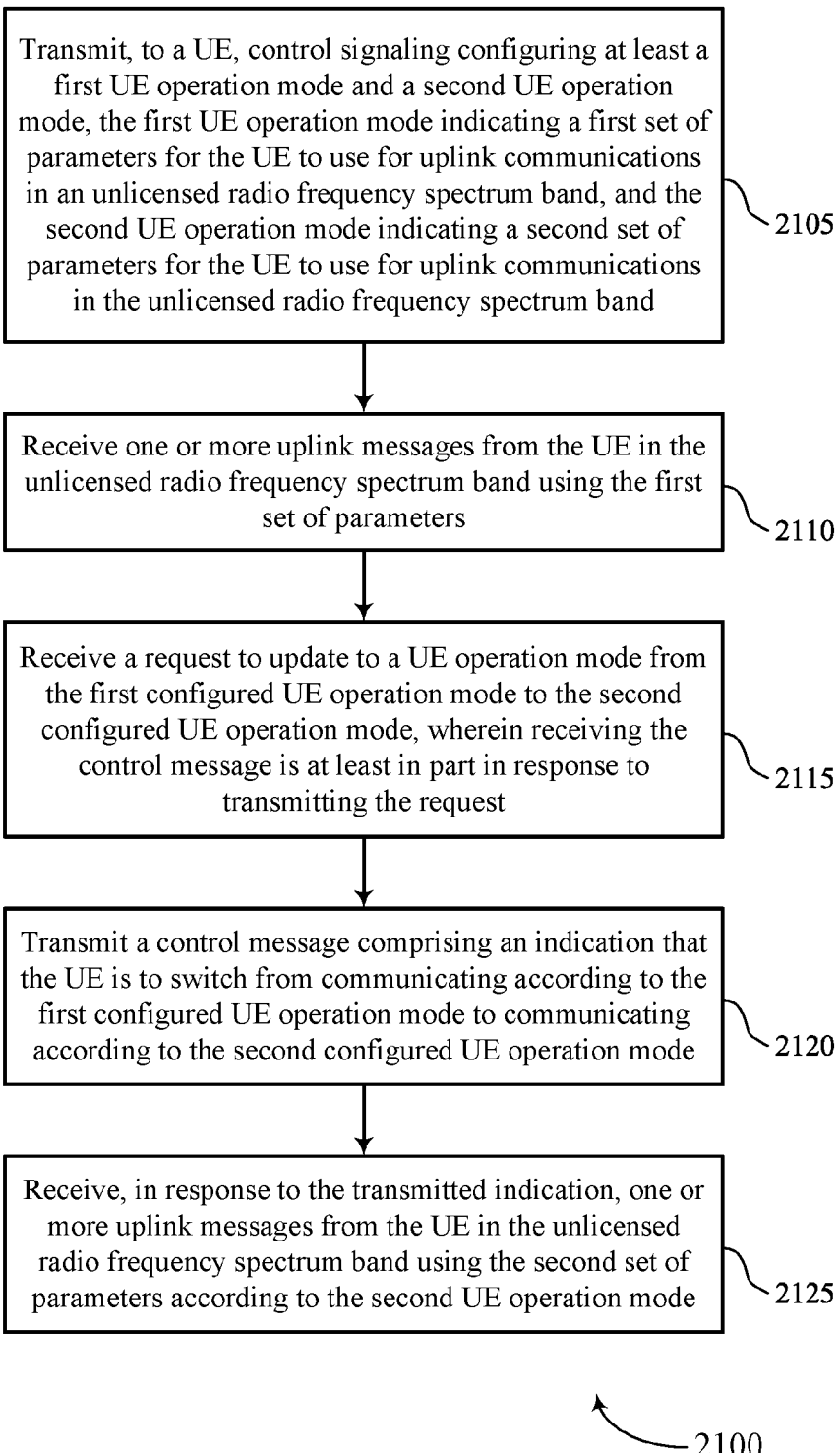

Transmit, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band

2105

Receive one or more uplink messages from the UE in the unlicensed radio frequency spectrum band using the first set of parameters

2110

Receive a request to update to a UE operation mode from the first configured UE operation mode to the second configured UE operation mode, wherein receiving the control message is at least in part in response to transmitting the request

2115

Transmit a control message comprising an indication that the UE is to switch from communicating according to the first configured UE operation mode to communicating according to the second configured UE operation mode

2120

Receive, in response to the transmitted indication, one or more uplink messages from the UE in the unlicensed radio frequency spectrum band using the second set of parameters according to the second UE operation mode

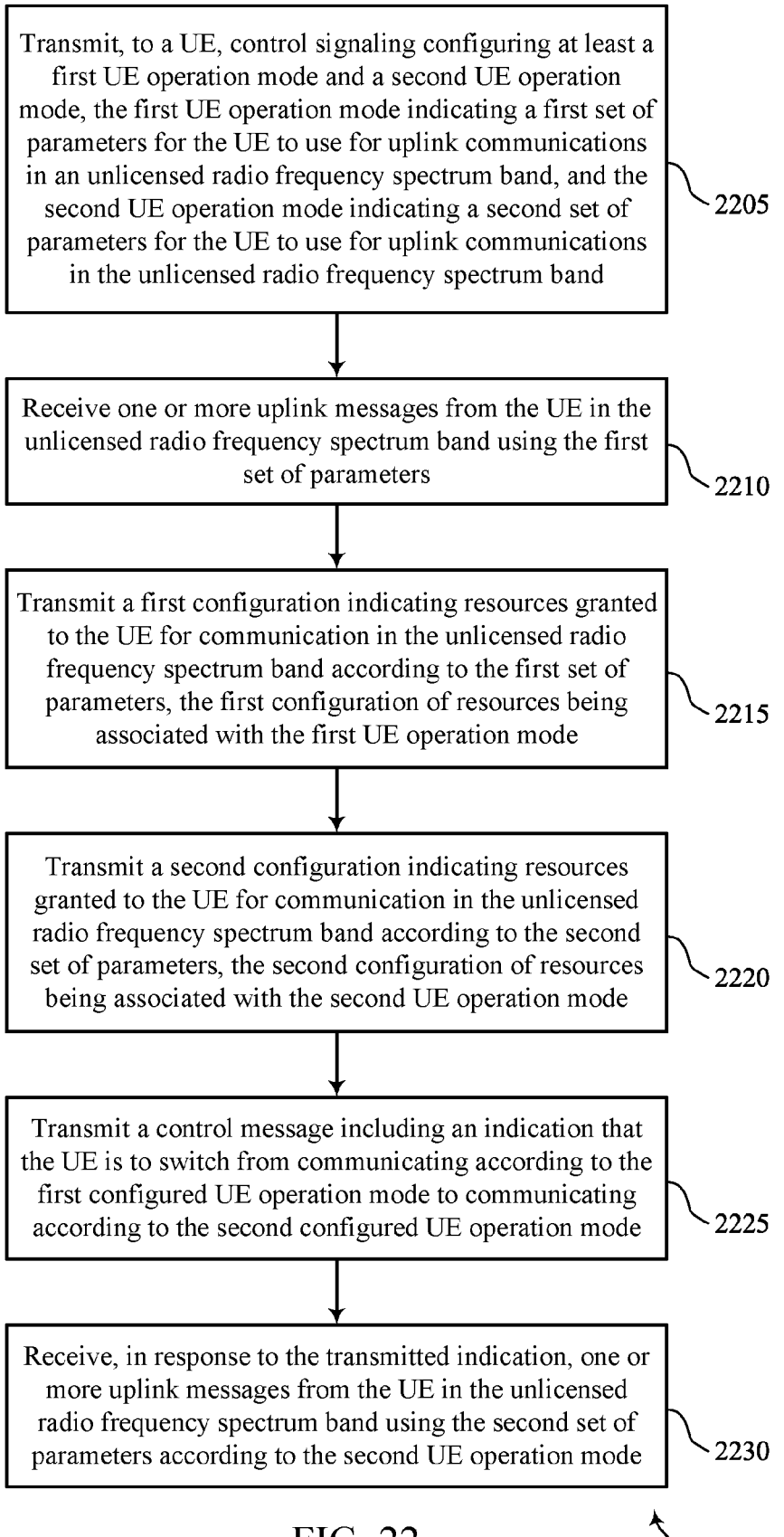

Transmit, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band

2205

Receive one or more uplink messages from the UE in the unlicensed radio frequency spectrum band using the first set of parameters

2210

Transmit a first configuration indicating resources granted to the UE for communication in the unlicensed radio frequency spectrum band according to the first set of parameters, the first configuration of resources being associated with the first UE operation mode

2215

Transmit a second configuration indicating resources granted to the UE for communication in the unlicensed radio frequency spectrum band according to the second set of parameters, the second configuration of resources being associated with the second UE operation mode

2220

Transmit a control message including an indication that the UE is to switch from communicating according to the first configured UE operation mode to communicating according to the second configured UE operation mode

2225

Receive, in response to the transmitted indication, one or more uplink messages from the UE in the unlicensed radio frequency spectrum band using the second set of parameters according to the second UE operation mode

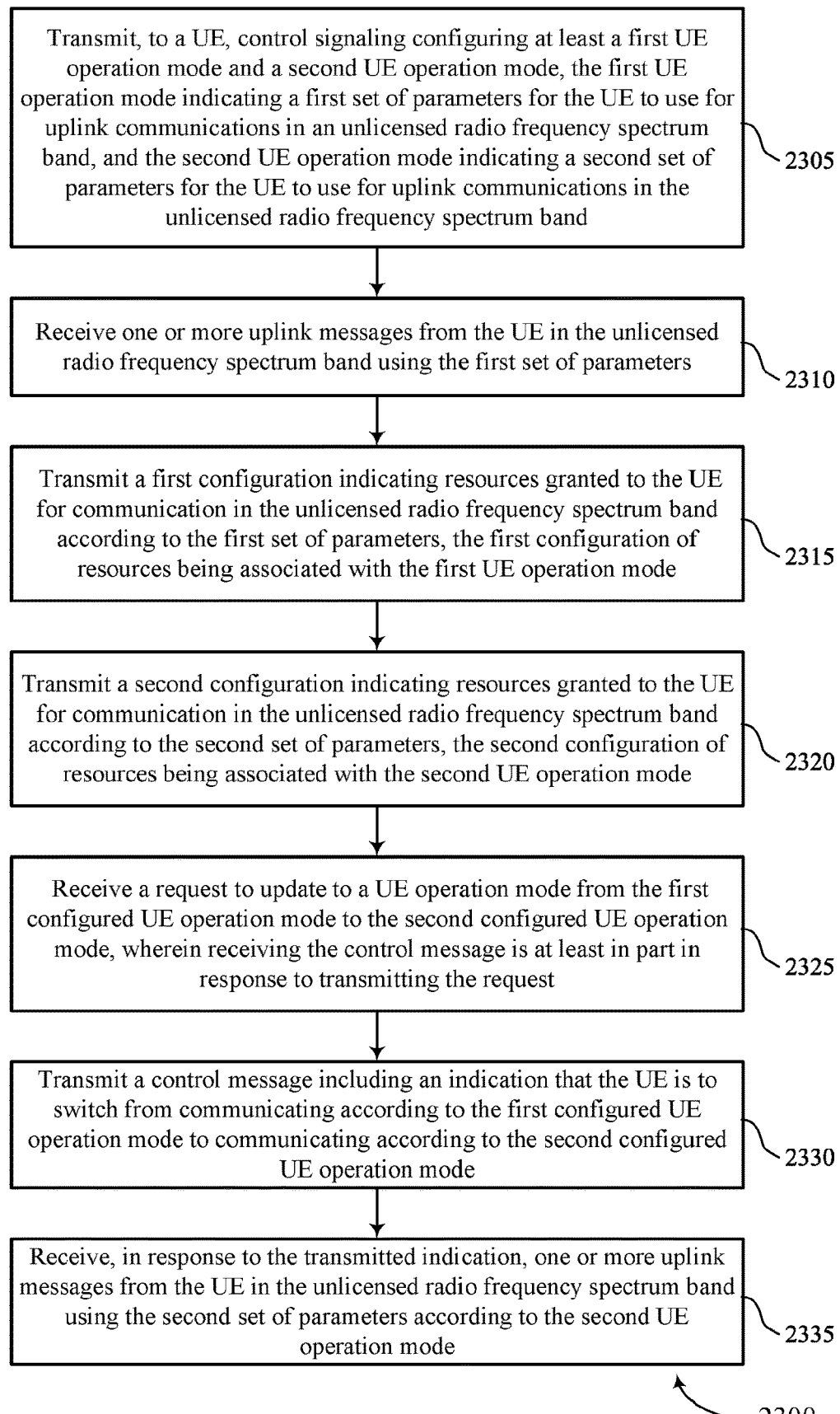

Transmit, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band

2305

Receive one or more uplink messages from the UE in the unlicensed radio frequency spectrum band using the first set of parameters

2310

Transmit a first configuration indicating resources granted to the UE for communication in the unlicensed radio frequency spectrum band according to the first set of parameters, the first configuration of resources being associated with the first UE operation mode

2315

Transmit a second configuration indicating resources granted to the UE for communication in the unlicensed radio frequency spectrum band according to the second set of parameters, the second configuration of resources being associated with the second UE operation mode

2320

Receive a request to update to a UE operation mode from the first configured UE operation mode to the second configured UE operation mode, wherein receiving the control message is at least in part in response to transmitting the request

2325

Transmit a control message including an indication that the UE is to switch from communicating according to the first configured UE operation mode to communicating according to the second configured UE operation mode

2330

Receive, in response to the transmitted indication, one or more uplink messages from the UE in the unlicensed radio frequency spectrum band using the second set of parameters according to the second UE operation mode

TECHNIQUES FOR SWITCHING BETWEEN CONFIGURED GRANT MODES

CROSS REFERENCE

The present application is a 371 national stage filing of International PCT Application No. PCT/CN2021/079248 by GUO et al. entitled "TECHNIQUES FOR SWITCHING BETWEEN CONFIGURED GRANT MODES," filed Mar. 5, 2021, which is assigned to the assignee hereof, and which is expressly incorporated by reference in its entirety herein.

FIELD OF TECHNOLOGY

The following relates to wireless communication at a user equipment (UE), including techniques for switching between configured grant (CG) modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support downlink and uplink communications from and to multiple base stations. Some wireless communications systems may also support communications over some physical channels, such as physical downlink shared channel (PDSCH) and physical uplink shared channel (PUSCH). As demand for communication efficiency increases, it may be desirable to provide improvements to communications from and to one or more base stations, among other examples.

SUMMARY

The described techniques relate to improved methods, systems, devices, and apparatuses that support techniques for switching between configured grant (CG) modes. Generally, the described techniques provide for configuring a communication device, which may be otherwise known as user equipment (UE) to support dynamic switching of CG modes when communicating from and to one or more base station. In some examples, a wireless communications system operating in unlicensed spectrum may support different CG modes, for example, ultra-reliable low-latency communications (URLLC) or an unlicensed new radio (NR-U) communications. In examples, communication according a URLLC CG mode may operate according to lower latency parameters, higher-reliability parameters, or both, than other communication modes, including other CG modes, for example an NR-U CG mode.

A UE may support both URLLC CG mode and NR-U CG mode. One or more aspects of the present disclosure provide for techniques for dynamic switching between URLLC CG mode and NR-U CG mode. For examples, a UE may be configured by a base station with one or more CG configurations associated with URLLC CG mode and NR-U CG mode. For example, the base station may transmit control signaling configuring at least a first UE operation mode (e.g., URLLC CG mode) and a second UE operation mode (e.g., NR-U CG mode). In some examples, the base station may use a control message to switch the UE between the two modes. For example, when the UE is configured with a URLLC CG mode, the base station may transmit a control message indicating that the UE is to switch from the URLLC CG mode to the NR-U CG mode. Thus, the described techniques may, as a result, include features for improvements to uplink communications and, in some examples, may promote enhanced efficiency for high reliability and low latency uplink operations in 5G systems, among other benefits.

A method for wireless communication at a UE is described. The method may include receiving, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band, transmitting one or more uplink messages to the base station in the unlicensed radio frequency spectrum band using the first set of parameters, receiving a control message including an indication that the UE is to switch from communicating according to the first configured UE operation mode to communicating according to the second configured UE operation mode, and transmitting, in response to the received indication, one or more uplink messages to the base station in the unlicensed radio frequency spectrum band using the second set of parameters according to the second UE operation mode.

An apparatus for wireless communication at a UE is described. The apparatus may include a processor, memory coupled with the processor, and instructions stored in the memory. The instructions may be executable by the processor to cause the apparatus to receive, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band, transmit one or more uplink messages to the base station in the unlicensed radio frequency spectrum band using the first set of parameters, receive a control message including an indication that the UE is to switch from communicating according to the first configured UE operation mode to communicating according to the second configured UE operation mode, and transmit, in response to the received indication, one or more uplink messages to the base station in the unlicensed radio frequency spectrum band using the second set of parameters according to the second UE operation mode.

3

Another apparatus for wireless communication at a UE is described. The apparatus may include means for receiving, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band, means for transmitting one or more uplink messages to the base station in the unlicensed radio frequency spectrum band using the first set of parameters, means for receiving a control message including an indication that the UE is to switch from communicating according to the first configured UE operation mode to communicating according to the second configured UE operation mode, and means for transmitting, in response to the received indication, one or more uplink messages to the base station in the unlicensed radio frequency spectrum band using the second set of parameters according to the second UE operation mode.

A non-transitory computer-readable medium storing code for wireless communication at a UE is described. The code may include instructions executable by a processor to receive, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band, transmit one or more uplink messages to the base station in the unlicensed radio frequency spectrum band using the first set of parameters, receive a control message including an indication that the UE is to switch from communicating according to the first configured UE operation mode to communicating according to the second configured UE operation mode, and transmit, in response to the received indication, one or more uplink messages to the base station in the unlicensed radio frequency spectrum band using the second set of parameters according to the second UE operation mode.

In some examples of the method, apparatuses, and non-transitory computer-readable medium described herein, receiving the control signaling may include operations, features, means, or instructions for receiving a configuration indicating resources granted to the UE for communication in the unlicensed radio frequency spectrum band, the configuration associated with at least the first UE operation mode and the second UE operation mode.

In some examples of the method, apparatuses, and non-transitory computer-readable medium described herein, receiving the control signaling may include operations, features, means, or instructions for receiving a first configuration indicating resources granted to the UE for communication in the unlicensed radio frequency spectrum band according to the first set of parameters, the first configuration of resources being associated with the first UE operation mode and receiving a second configuration indicating resources granted to the UE for communication in the unlicensed radio frequency spectrum band according to the second set of parameters, the second configuration of resources being associated with the second UE operation mode.

Some examples of the method, apparatuses, and non-transitory computer-readable medium described herein may further include operations, features, means, or instructions for transmitting a request to update to a UE operation mode from the first configured UE operation mode to the second configured UE operation mode, where receiving the control message may be at least in part in response to transmitting the request.

In some examples of the method, apparatuses, and non-transitory computer-readable medium described herein, the request includes at least a bit indicating a request to switch a UE operation mode, a bit field indicating an identity of a serving cell associated with the request, and a bit field indicating an identity of a bandwidth part associated with the request.

In some examples of the method, apparatuses, and non-transitory computer-readable medium described herein, the request includes at least a bitmap indicating a request to switch a UE operation mode for each configuration of resources, a bit field indicating an identity of a serving cell associated with the request, and a bit field indicating an identity of a bandwidth part associated with the request.

Some examples of the method, apparatuses, and non-transitory computer-readable medium described herein may further include operations, features, means, or instructions for transmitting, to the base station, a feedback message in response to receiving the control message, the feedback message indicating that the UE may be to switch from communicating according to the first configured UE operation mode to communicating according to the second configured UE operation mode.

In some examples of the method, apparatuses, and non-transitory computer-readable medium described herein, the feedback message may be transmitted during a first time slot and the uplink messages using the second set of parameters according to the second UE operation mode may be transmitted during a second time slot, and the second time slot may be at least a threshold number of time slots after the first time slot.

Some examples of the method, apparatuses, and non-transitory computer-readable medium described herein may further include operations, features, means, or instructions for determining an interference condition associated with uplink communications in the unlicensed radio frequency spectrum band and transmitting, based on the interference condition satisfying a threshold, a second control message requesting an update to a UE operation mode from the first configured UE operation mode to the second configured UE operation mode.

In some examples of the method, apparatuses, and non-transitory computer-readable medium described herein, at least one of the first UE operation mode and the second UE operation mode may be associated with a reconfiguration timer.

Some examples of the method, apparatuses, and non-transitory computer-readable medium described herein may further include operations, features, means, or instructions for receiving, from the base station, an indication of a default UE operation mode that includes one of the first UE operation mode or the second UE operation mode.

In some examples of the method, apparatuses, and non-transitory computer-readable medium described herein, the indication of the control message includes at least a bit indicating for the UE to switch a UE operation mode, a bit field indicating an identity of a serving cell associated with the UE operation mode switch, and a bit field indicating an identity of a bandwidth part associated with the UE operation mode switch.

In some examples of the method, apparatuses, and non-transitory computer-readable medium described herein, the indication of the control message includes at least a bitmap indicating an operation mode switch for each configuration of resources, a bit field indicating an identity of a serving cell associated with the UE operation mode switch, and a bit field indicating an identity of a bandwidth part associated with the UE operation mode switch.

In some examples of the method, apparatuses, and non-transitory computer-readable medium described herein, the first UE operation mode includes an URLLC operation mode, and the second UE operation mode includes an NR-U operation mode.

A method for wireless communication at a base station is described. The method may include transmitting, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band, receiving one or more uplink messages from the UE in the unlicensed radio frequency spectrum band using the first set of parameters, transmitting a control message including an indication that the UE is to switch from communicating according to the first configured UE operation mode to communicating according to the second configured UE operation mode, and receiving, in response to the transmitted indication, one or more uplink messages from the UE in the unlicensed radio frequency spectrum band using the second set of parameters according to the second UE operation mode.

An apparatus for wireless communication at a base station is described. The apparatus may include a processor, memory coupled with the processor, and instructions stored in the memory. The instructions may be executable by the processor to cause the apparatus to transmit, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band, receive one or more uplink messages from the UE in the unlicensed radio frequency spectrum band using the first set of parameters, transmit a control message including an indication that the UE is to switch from communicating according to the first configured UE operation mode to communicating according to the second configured UE operation mode, and receive, in response to the transmitted indication, one or more uplink messages from the UE in the unlicensed radio frequency spectrum band using the second set of parameters according to the second UE operation mode.

Another apparatus for wireless communication at a base station is described. The apparatus may include means for transmitting, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band, means for receiving one or more uplink messages from the UE in the unlicensed radio frequency spectrum band using the first set of parameters, means for transmitting a control message including an indication that the UE is to switch from communicating according to the first configured UE operation mode to communicating according to the second configured UE operation mode, and means for receiving, in response to the transmitted indication, one or more uplink messages from the UE in the unlicensed radio frequency spectrum band using the second set of parameters according to the second UE operation mode.

A non-transitory computer-readable medium storing code for wireless communication at a base station is described. The code may include instructions executable by a processor to transmit, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band, receive one or more uplink messages from the UE in the unlicensed radio frequency spectrum band using the first set of parameters, transmit a control message including an indication that the UE is to switch from communicating according to the first configured UE operation mode to communicating according to the second configured UE operation mode, and receive, in response to the transmitted indication, one or more uplink messages from the UE in the unlicensed radio frequency spectrum band using the second set of parameters according to the second UE operation mode.

In some examples of the method, apparatuses, and non-transitory computer-readable medium described herein, transmitting the control signaling may include operations, features, means, or instructions for a configuration indicating resources granted to the UE for communication in the unlicensed radio frequency spectrum band, the configuration associated with at least the first UE operation mode and the second UE operation mode.

In some examples of the method, apparatuses, and non-transitory computer-readable medium described herein, transmitting the control signaling may include operations, features, means, or instructions for transmitting a first configuration indicating resources granted to the UE for communication in the unlicensed radio frequency spectrum band according to the first set of parameters, the first configuration of resources being associated with the first UE operation mode and transmitting a second configuration indicating resources granted to the UE for communication in the unlicensed radio frequency spectrum band according to the second set of parameters, the second configuration of resources being associated with the second UE operation mode.

Some examples of the method, apparatuses, and non-transitory computer-readable medium described herein may further include operations, features, means, or instructions for receiving a request to update to a UE operation mode from the first configured UE operation mode to the second configured UE operation mode, where receiving the control message may be at least in part in response to transmitting the request.

In some examples of the method, apparatuses, and non-transitory computer-readable medium described herein, the request includes at least a bit indicating a request to switch a UE operation mode, a bitmap indicating a request to switch a UE operation mode for each configuration of resources, a bit field indicating an identity of a serving cell associated with the request, and a bit field indicating an identity of a bandwidth part associated with the request.

7

8

Some examples of the method, apparatuses, and non-transitory computer-readable medium described herein may further include operations, features, means, or instructions for receiving, from the UE, a feedback message in response to transmitting the control message, the feedback message indicating that the UE may be to switch from communicating according to the first configured UE operation mode to communicating according to the second configured UE operation mode.

In some examples of the method, apparatuses, and non-transitory computer-readable medium described herein, at least one of the first UE operation mode and the second UE operation mode may be associated with a reconfiguration timer.

Some examples of the method, apparatuses, and non-transitory computer-readable medium described herein may further include operations, features, means, or instructions for transmitting, to the UE, an indication of a default UE operation mode that includes one of the first UE operation mode or the second UE operation mode.

In some examples of the method, apparatuses, and non-transitory computer-readable medium described herein, the indication of control message includes at least a bit indicating for the UE to switch a UE operation mode, a bitmap indicating an operation mode switch for each configuration of resources, a bit field indicating an identity of a serving cell associated with the UE operation mode switch, and a bit field indicating an identity of a bandwidth part associated with the UE operation mode switch.

BRIEF DESCRIPTION OF THE DRAWINGS

FIG. 3 illustrates an example of a process flow that supports techniques for switching between CG modes in accordance with aspects of the present disclosure.

FIGS. 16 through 23 show flowcharts illustrating methods that support techniques for switching between CG modes in accordance with aspects of the present disclosure.

DETAILED DESCRIPTION

Figure 1:
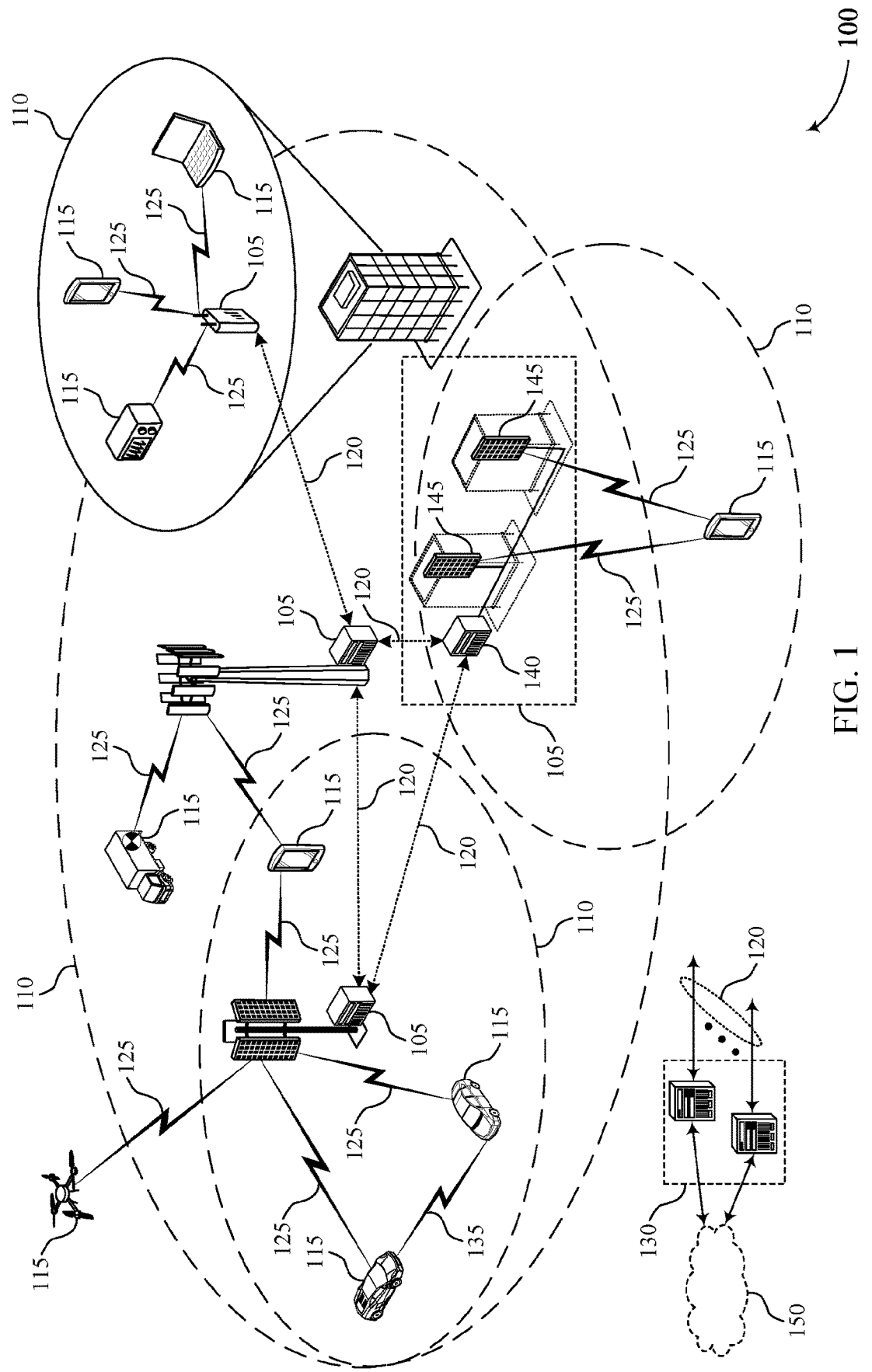
FIG. 1 illustrates an example of a wireless communications system that supports techniques for switching between configured grant (CG) modes in accordance with aspects of the present disclosure.

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies including fourth generation (4G) systems, such as Long Term Evolution (LTE) systems, as well as fifth generation (5G) systems, which may be referred to as New Radio (NR) systems. The described techniques may be used to configure the UEs to support communications to and from multiple transmission and reception points (TRPs). In some wireless communications systems, a UE may communicate with a base station over a channel according to a configured grant (CG) from the base station. The UE having uplink messages to transmit using a CG may activate resources of a physical uplink shared channel (PUSCH) that are configured by the CG from the base station, on which uplink transmissions may be sent. In some examples, a wireless communications system operating in unlicensed spectrum may support a CG communication according to low-latency parameters, high-reliability parameters, or both—for example, ultra-reliable low-latency communications (URLLC). In other examples, the wireless communication system may support a CG communication in an unlicensed new radio (NR-U) system. In some cases or operating environments, a UE using a URLLC CG mode may experience lower latency and higher reliability than a UE using an NR-U CG mode. In some cases, a UE using an NR-U CG mode may experience a threshold number of listen before talk (LBT) failures in an unlicensed band.

In some examples, the UE may support semi-static switching between using a URLLC CG mode and an NR-U CG mode. However, semi-static switching may include switching latency. Additionally or alternatively, a base station may be unaware of a change in interference condition at the UE for uplink transmission. One or more aspects of the present disclosure provide for techniques for dynamic switching between URLLC CG mode and NR-U CG mode.

A UE and a base station may support dynamic switching between URLLC CG mode and NR-U CG mode to account for a change in interference level at the UE. The UE may be configured by the base station with one or more CG configurations associated with two modes. For example, the base station may transmit control signaling configuring at least a first UE operation mode (e.g., URLLC CG mode) and a second UE operation mode (e.g., NR-U CG mode). Although URLLC CG mode and NR-U CG mode are specifically discussed herein, additional or alternative UE operation modes (e.g., other CG modes) may be used consistent with the techniques and examples described herein. In some examples, the first UE operation mode may indicate a first set of parameters for the UE to use for uplink communications in an unlicensed radio frequency spectrum band, and the second UE operation mode may indicate a second set of parameters for the UE to use for uplink communications in the unlicensed radio frequency spectrum band. In some examples, different UE operation modes (e.g., different CG modes) may be characterized by having different sets of parameters for the ULE to use for uplink communications (e.g., for CG communications in an unlicensed radio frequency spectrum band). The base station may then use a control message to switch the UE between the two modes. For example, the UE may have a CG configured with a URLLC mode and a NR-U mode. In some cases, the base station may transmit a control message indicating that the UE is to switch from the URLLC CG mode to the NR-U CG mode. Additionally or alternatively, the UE may transmit a control message to the base station to request to switch between modes, where the base station may respond by transmitting a control message to indicate an updated CG mode. According to one or more aspects, the UE may support CG configurations where each CG configuration is configured with two modes. Additionally or alternatively, the UE may be configured with two separate CG processes. For example, the UE may have a first CG process corresponding to a URLLC CG, as well as a second process corresponding to an NR-U CG. In some examples, the base station may activate a CG process using a control message.

Particular aspects of the subject matter described in this disclosure may be implemented to realize one or more of the following potential improvements, among others. The techniques employed by the UE may provide benefits and enhancements to the operation of the UE. For example, operations performed by the UE may provide improvements to communications when operating in 5G/NR systems. In some examples, configuring the UE to support dynamic switching between CG modes, among other examples in 5G/NR systems, may support improvements in power consumption, resource usage, coverage enhancements, spectral efficiency, higher data rates, among other benefits.

Aspects of the disclosure are initially described in the context of wireless communications systems. Aspects of the disclosure are further illustrated by and described with reference to process flows and control elements. Aspects of the disclosure are further illustrated by and described with reference to apparatus diagrams, system diagrams, and flowcharts that relate to techniques for switching between CG modes.

FIG. 1 illustrates an example of a wireless communications system 100 that supports techniques for switching between CG modes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125.

The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a ULE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to one or more aspects of the present disclosure, a UE 115 may receive control signaling from a base station 105. The control signaling may configure at least a first UE operation mode and a second UE operation mode. In some examples, the first UE operation mode may indicate a first set of parameters for the UE to use for uplink communications in an unlicensed radio frequency spectrum band, and the second UE operation mode may indicate a second set of parameters for the UE to use for uplink communications in the unlicensed radio frequency spectrum band. In some examples, the UE 115 may transmit one or more uplink messages to the base station in the unlicensed radio frequency spectrum band using the first set of parameters. The UE 115 may then receive a control message including an indication that the UE 115 is to switch from communicating according to the first configured UE operation mode to communicating according to the second configured UE operation mode. In response to receiving the control message, the UE 115 may transmit one or more uplink messages to the base station 105 in the unlicensed radio frequency spectrum band using the second set of parameters according to the second UE operation mode.

Figure 2:
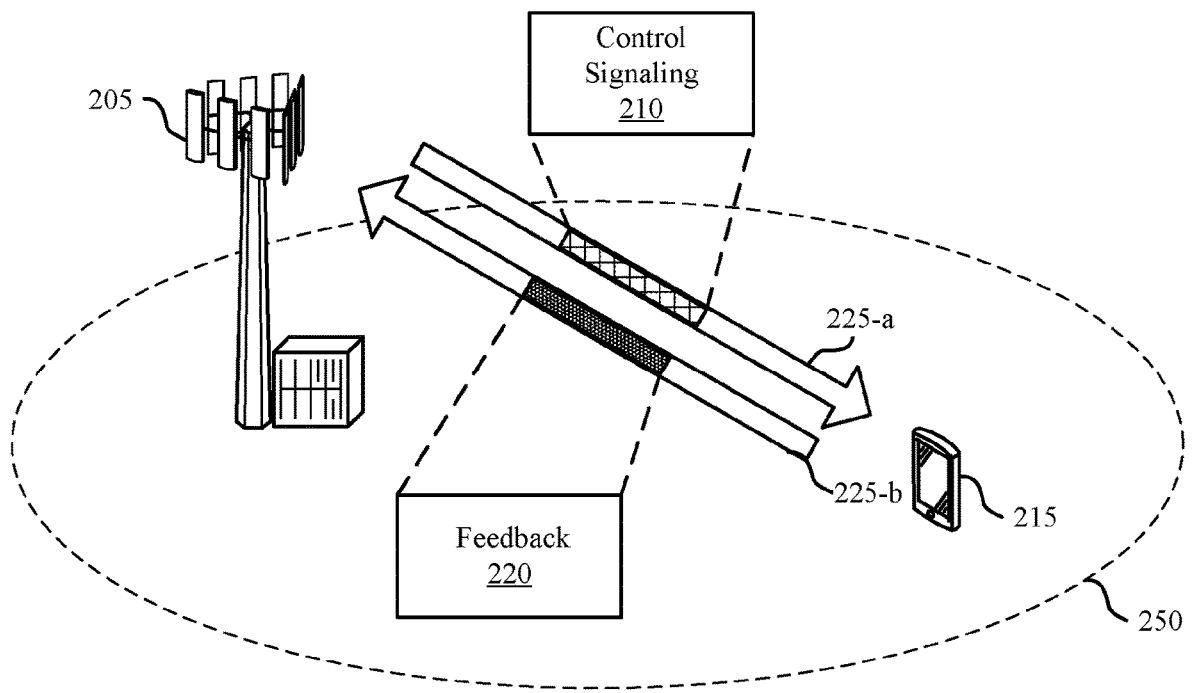
FIG. 2 illustrates an example of a wireless communications system that supports techniques for switching between CG modes in accordance with aspects of the present disclosure.

FIG. 2 illustrates an example of a wireless communications system 200 that supports techniques for switching between CG modes in accordance with aspects of the present disclosure. In some examples, the wireless communications system 200 may implement aspects of the wireless communications system 100. For examples, the wireless communications system 200 may include a base station 205 which may be an example of the corresponding devices described with reference to FIG. 1, such as a base station 105. The wireless communications system 200 may also include a UE 215, which may be an example of the corresponding devices described with reference to FIG. 1, such as a UE 115. For example, the wireless communications system 200 may support techniques for uplink transmission from the UE 215 to the base station 205 according to a CG.

Base station 205 may serve one or more UEs 115, including UE 215, within coverage area 250. The base station 205 may transmit messages to UE 215 over downlink communication link 225-a. The UE 215 may receive message (e.g., control signaling 210) from the base station 205. The UE 215 may communicate with the base station 205 by transmitting messages over uplink communications link 225-b. According to one or more aspects, wireless communications system 200 may support techniques to switch between URLLC CG and NR-U CG.

Some wireless communications systems may provide for UE feedback enhancements for HARQ-ACK feedback. In some examples, channel state information (CSI) feedback enhancements may allow for more accurate modulation and coding scheme (MCS) selection. Uplink enhancements for URLLC in unlicensed controlled environments may support UE-initiated channel occupancy time (COT) for frame based equipment (FBE).

In some aspects, the UE 215 scheduling uplink transmissions using a CG may activate a CG mode via control signaling 210 (e.g., an RRC configuration) received from the base station 205. The UE 215 may acknowledge the configuration indicated in control signaling 210 by transmitting feedback 220 to the base station 205. In some examples, the wireless communications system 200 may support harmonizing uplink CG enhancements in NR-U and URLLC. For instance, the wireless communications system 200 may support a CG mode for communication according to low-latency parameters, high-reliability parameters, or both—for example, URLLC. In other examples, the wireless communications system 200 may support a CG mode for communication in an NR-U system.

In some cases, the wireless communications system 200 may support intra-UE multiplexing and prioritization of traffic with different priority. For example, the wireless communications system 200 may specify multiplexing behavior among HARQ-ACK or scheduling request (SR) or CSI and PUSCH for traffic with different priorities, including the cases with uplink control information (UCI) on physical uplink control channel (PUCCH) and UCI on PUSCH. Additionally or alternatively, the wireless communications system 200 may specify physical layer (PHY) prioritization of overlapping dynamic grant PUSCH and CG PUSCH of different PHY priorities on a BWP of a serving cell, including the related cancelation behavior for the PUSCH of lower PHY priority.

The wireless communications system 200 may further support enhancements for support of time synchronization. For example, the wireless communications system 200 may support impacts on uplink time synchronization for time sensitive networking (TSN). Additionally or alternatively, the wireless communications system 200 may support propagation delay compensation enhancements, including mobility issues, as well as enhancements based on QoS related parameters (e.g., survival time, burst spread).

As depicted herein, URLLC CG may be designed to satisfy the latency and reliability parameters of URLLC services. In some examples, NR-U CG may be designed to reduce the impact of LBT failure in unlicensed band. Examples of CG features in URLLC and NR-U may be summarized in Table 1:

TABLE 1

| CG features | URLLC supportable | NR-U supportable |
| --- | --- | --- |
| Multiple CG configurations | Yes | Yes |
| HARQ Process ID determination | Equation with first transmission occasion (TO) | Decided and reported by UE in CG-UCI |
| Sharing HARQ ID among multiple CG configurations | No | Yes |
| Redundancy version (RV) determination | One of the RV sequences {0, 0, 0, 0} {0, 3, 0, 3} {0, 2, 3, 1} can be configured and associated with TO | Decided and reported by UE in CG-UCI |
| Flexible initial TO | Yes. Can be enabled/disabled by Configuredgrantconfig-StartingfromRV0 | Yes |
| Repetition scheme(s) | Type A/B | Multiple transport block (TB) |
| CG-Downlink feedback information (DFI) | No | Yes |
| CG Re-transmission timer | No | Yes |
| CG automatic Re-transmission scheme | No | Yes |

As shown in Table 1, both URLLC CG and NR-U CG may support multiple CG configurations. That is, both URLLC CG and NR-U CG may support CG configurations indicating resources granted to the UE for communication in a radio frequency spectrum band. In some examples, URLLC CG may not support sharing HARQ identifiers among multiple CG configurations. On the other hand, NR-U CG may support sharing HARQ identifiers among multiple CG configurations. Further, URLLC CG may support RV determination according to a sequence (e.g., {0,0, 0,0}, {0,3,0,3}, or {0,2,3,1}) that may be configured and associated with transmission occasion (TO), while the RV determination of NR-U CG may be determined and reported by the UE in CG-UCI.

In some examples, both URLLC CG and NR-U CG may support flexible initial TO. Further, URLLC CG may allow flexible initial TO be enabled and disabled according to CG configuration parameter. In some cases, URLLC CG may support type A/B repetition schemes, while NR-U CG may support multiple TB transmission schemes. In some examples, URLLC CG may not support CG downlink feedback information (DFI), CG retransmission timers, or a CG automatic retransmission scheme. Additionally or alternatively, NR-U CG may support CG downlink feedback information (DFI), CG retransmission timers, and a CG automatic retransmission scheme.

In some cases, a UE using a URLLC CG may experience lower latency and higher reliability than a UE using an NR-U CG. Additionally or alternatively, a UE using URLLC CG in an unlicensed controlled environment may be based on the environment including other devices operating on the unlicensed band (e.g., other devices installed by a facility owner). Thus, interference from outside systems or radio access technology (RAT) may be infrequent, yet still result in listen before talk (LBT) failures. However, a UE using an NR-U CG may experience a reduced number of LBT failures in the unlicensed radio frequency spectrum band.

In some examples, the wireless communications system 200 may support semi-static switching between using a URLLC CG and an NR-U CG. For instance, one of URLLC CG mode and NR-U CG mode may be configured based on an interference condition. However, semi-static switching may include large switching latency due to RRC reconfiguration. Additionally or alternatively, because the LBT procedure may be performed at the UE 215 for uplink transmission, the network (e.g., base station 105) may not be aware of a change in interference condition. In some instances, the UE 215 may have better knowledge about changes in interference.

In some cases, the wireless communications system 200 may support dynamic switching between a URLLC CG mode and an NR-U CG mode based on specifying physical layer feedback enhancements. For example, the control signaling 210 may include a configuration for both a default CG mode and a second CG mode (e.g., the URLLC CG mode and the NR-U CG mode). As shown in the example of FIG. 2, the base station 205 may transmit control signaling 210 configuring at least a first UE operation mode (e.g., CG mode) and a second UE operation mode. For example, the first UE operation mode may include an URLLC operation mode, and the second UE operation mode may include NR-U operation mode. In some examples, the first UE operation mode (e.g., the URLLC CG mode) may indicate a first set of parameters for the UE to use for uplink communications in an unlicensed radio frequency spectrum band. Additionally or alternatively, the second UE operation mode (e.g., NR-U CG mode) may indicate a second set of parameters for the UE to use for uplink communications in the unlicensed radio frequency spectrum band. In some aspects, the default CG mode may be configured using the control signaling 210 (e.g., an RRC message). The UE 215 may then transmit one or more uplink messages to the base station 205 in the unlicensed radio frequency spectrum band using the first set of parameters. That is, if the default CG mode of the UE 215 is configured as the URLLC CG mode, then the UE 215 may use the first set of parameters associated with the URLLC CG mode to communicate with the base station 205.

In some examples, the base station 205 may send a control message to the UE 215 (e.g., a MAC control element (CE) sent separately from control signaling 210) to switch from the default CG mode to the second CG mode. Subsequently, the UE 215 may transmit feedback 220 (e.g., a PUCCH that includes HARQ-ACK information) to the base station 205 to acknowledge the switch indicated by the MAC CE. In other examples, the UE 215 may transmit a MAC CE to the base station 205 to request to switch CG modes. In such examples, the base station may transmit a second MAC CE to the UE 215 to acknowledge the request to switch CG modes. Subsequently, the UE 215 may transmit feedback 220 (e.g., a PUCCH that includes HARQ-ACK information) to the base station 205 to acknowledge the switch indicated by the MAC CE. Upon receiving the MAC CE from the base station 205, the UE 215 may transmit one or more uplink messages via uplink communications link 225-b to the base station 205 in the unlicensed radio frequency spectrum band using the set of parameters associated with the second CG mode.

Additionally or alternatively, the control signaling 210 may include a configuration for two separate CG processes. For example, the control signaling 210 may include a configuration for a default CG process (e.g., a process corresponding to a URLLC CG) and a second CG process (e.g., a process corresponding to an NR-U CG). In some examples, the base station 205 may send an indication to the UE 215 (e.g., a MAC CE) to switch from the default CG process to the second CG process. Subsequently, the UE 215 may transmit feedback 220 (e.g., a PUCCH that includes HARQ-ACK information) to the base station 205 to acknowledge the switch indicated by the MAC CE. In other examples, the UE 215 may transmit a MAC CE to the base station 205 to request to switch the CG process. In such examples, the base station may transmit a second MAC CE to the UE 215 to acknowledge the request to switch the CG process. Subsequently, the UE 215 may transmit feedback 220 (e.g., a PUCCH that includes HARQ-ACK information) to the base station 205 to acknowledge the switch indicated by the MAC CE.

Figure 3:
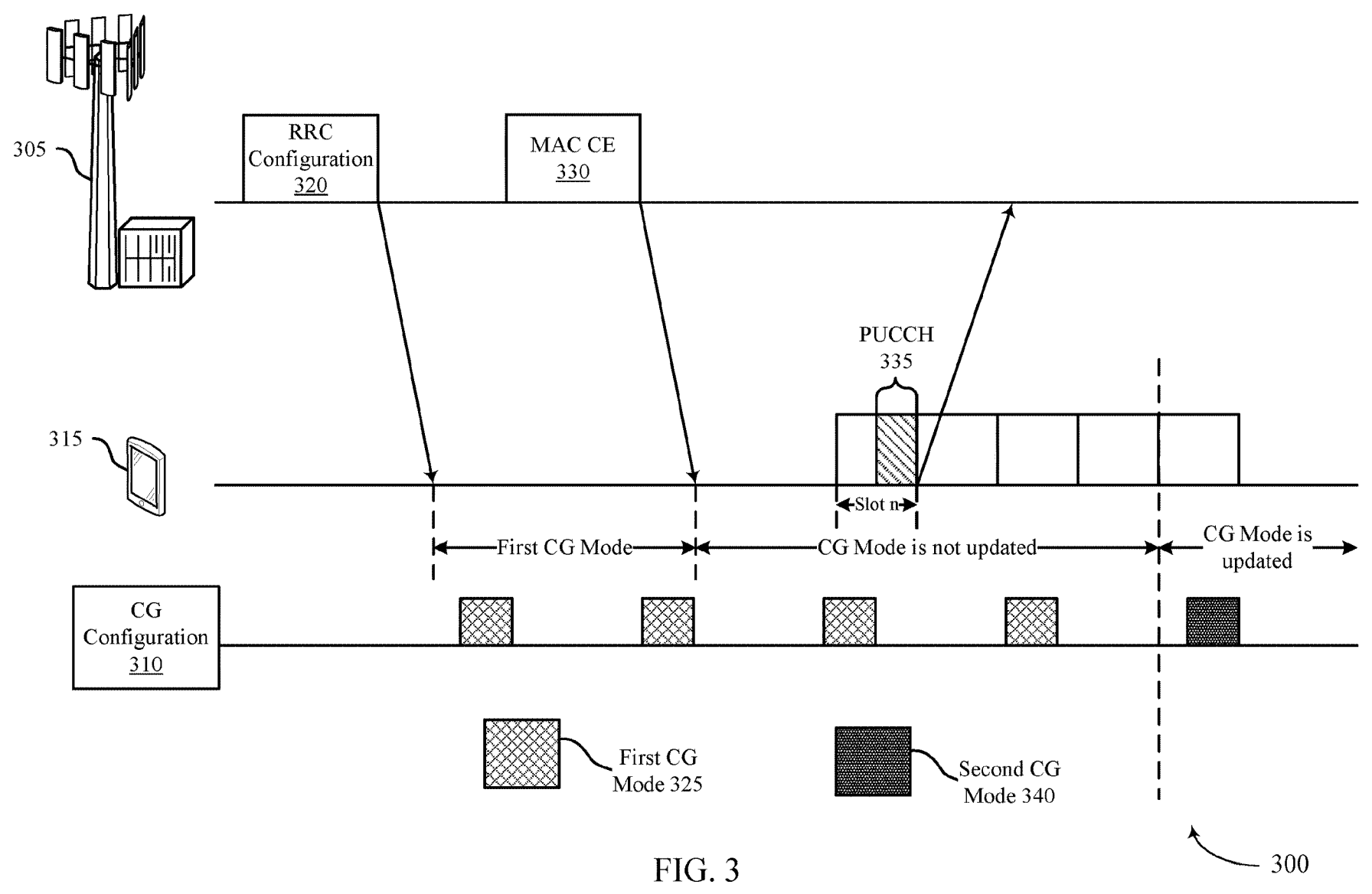

FIG. 3 illustrates an example of a process flow 300 that supports techniques for switching between CG modes in accordance with aspects of the present disclosure. The process flow 300 may include a base station 305 and a UE 315, which may be examples of a base station 105 and a UE 115 described with reference to FIGS. 1 and 2.

In some examples, the base station 305 may dynamically determine to switch the CG mode of the UE 315. For example, the base station 305 may transmit an RRC configuration 320 to the UE 315. The RRC configuration 320 may be an example of a control signaling (e.g., an RRC configuration) which configures the UE 315 with two CG modes. For example, the RRC configuration 320 may include a configuration for a URLLC CG mode and a NR-U CG mode. In some cases, the configuration for a URLLC CG mode and a NR-U CG mode may be determined by the network. The URLLC CG mode may indicate a first set of parameters for the UE 315 to use for uplink communications in an unlicensed radio frequency spectrum band, and the NR-U CG mode may indicate a second set of parameters for the UE to use for uplink communications in the unlicensed radio frequency spectrum band. In some examples, the RRC configuration 320 (e.g., RRC parameter) may indicate the CG mode to be used by the UE 315. Alternatively, the UE 315 may be configured with a default CG mode.

In some examples, the UE 315 may be configured with multiple CG configurations, where each CG configuration indicates resources granted to the UE 315 for communication in the unlicensed radio frequency spectrum band. According to one or more aspects, each CG configuration may be configured with two modes and the base station 305 may use a MAC CE to switch between the two modes. As depicted in the example of FIG. 3, the UE 315 may operate according to the CG configuration 310 based on the received RRC configuration 320. In some examples, the CG configuration 310 may include an indication of a default CG mode (e.g., a URLLC CG mode). When UE 315 receives the RRC configuration 320, the UE 315 may begin operating in the default CG mode. In some examples, the RRC configuration 320 may include a parameter indicating which CG mode is the default CG mode (e.g., the parameter may indicate whether URLLC is the default CG mode or NR-U is the default CG mode). Additionally or alternatively, the default CG mode may be determined prior to the RRC configuration 320 or otherwise be pre-configured. The UE 315 may utilize a first CG mode (e.g., default CG mode) to transmit one or more uplink messages to the base station 305 in the unlicensed radio frequency spectrum band using the first set of parameters associated with the first CG mode.

In some cases, it may be advantageous to switch the CG mode of the UE 315. For example, the UE 315 may be operating according to the URLLC CG mode and the base station may determine an interference condition (e.g., a quantity of LBT failures). Thus, the base station 305 may transmit a MAC CE 330 to the UE 315 to indicate that the UE 315 is to switch from a first CG mode (e.g., default CG mode) to a second CG mode (e.g., switch from the URLLC CG mode to the NR-U CG mode). When the UE receives a control message (e.g., MAC CE 330) from the base station 305, the UE 315 may transmit a feedback message. In some examples, the feedback message may indicate that the UE 315 is to switch from communicating according to the first CG mode to communicating according to the second CG mode. As depicted in the example of FIG. 3, the UE 315 may transmit a PUCCH 335 that includes HARQ-ACK information corresponding to the PDSCH carrying the MAC CE 330 to the base station 305 to acknowledge the change in CG mode indicated in the MAC CE 330. In some cases, the UE may refrain from switching from the default CG mode to the second CG mode for a quantity of slots after transmitting the PUCCH 335. That is, the UE 315 may transmit the feedback message a first time slot (e.g., slot n) and the uplink messages using the second CG mode may be transmitted during a second time slot. The second time slot may be at least a threshold number of time slots after the first time slot. For example, if the PUCCH 335 is transmitted in a slot n, the UE 315 may refrain from switching from the default CG mode to the second mode until a slot $$n + 3N_{slot}^{subframe,\mu},$$

where N is a constant and μ is the subcarrier spacing (SCS) configuration for the PUCCH.

Figure 4:
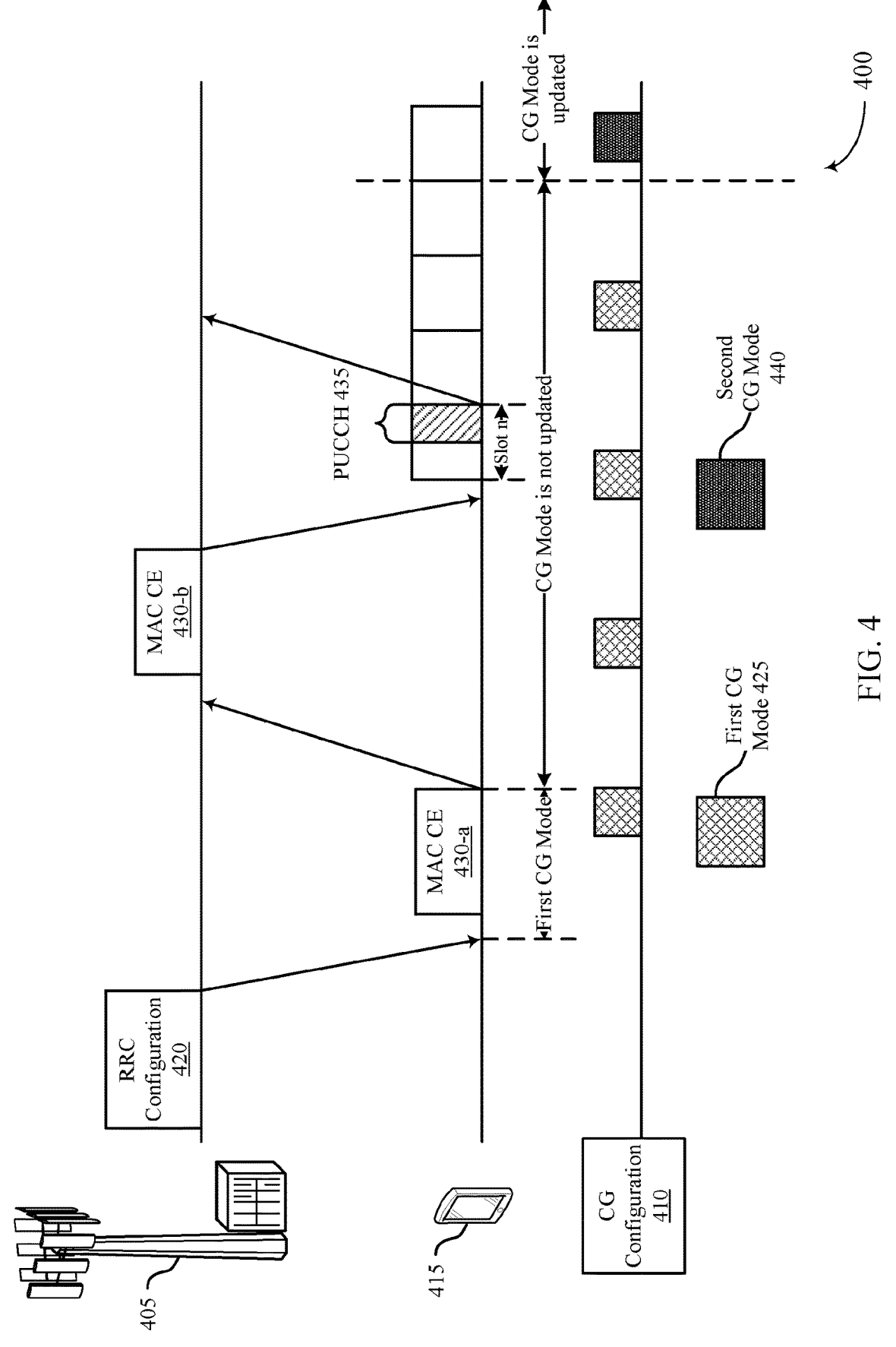
FIG. 4 illustrates an example of a process flow that supports techniques for switching between CG modes in accordance with aspects of the present disclosure.

FIG. 4 illustrates an example of a process flow 400 that supports techniques for switching between CG modes in accordance with aspects of the present disclosure. The process flow 400 may include a base station 405 and a UE 415, which may be examples of a base station 105 and a UE 115 described with reference to FIGS. 1 and 2.

According to one or more aspects of the present disclosure, the UE 415 may assist in dynamically determining to switch the CG mode of the UE 415. For example, the base station 405 may transmit an RRC configuration 420 to the UE 415. As depicted herein, the RRC configuration 420 may be an example of a control signaling (e.g., an RRC configuration) which configures the UE 415 with at least two CG modes. For example, the RRC configuration 420 may include a configuration for a URLLC CG mode and a NR-U CG mode. In some cases, the configuration for a URLLC CG mode and a NR-U CG mode may be determined by the network. The URLLC CG mode may indicate a first set of parameters for the UE 415 to use for uplink communications in an unlicensed radio frequency spectrum band, and the NR-U CG mode may indicate a second set of parameters for the UE to use for uplink communications in the unlicensed radio frequency spectrum band. In some examples, the RRC configuration 420 (e.g., RRC parameter) may indicate the CG mode to be used by the UE 415. Alternatively, the UE 415 may be configured with a default CG mode.

In some examples, the UE 415 may be configured with multiple CG configurations, where each CG configuration indicates resources granted to the UE 415 for communication in the unlicensed radio frequency spectrum band. According to one or more aspects, each CG configuration may be configured with two modes. As depicted in the example of FIG. 4, the UE 415 may use a MAC CE 430-a to request to switch between the two modes. In some examples, the UE 415 may operate according to the CG configuration 410 based on the received RRC configuration 420. In some examples, the CG configuration 410 may include an indication of a default CG mode (e.g., a first UE operation mode or a URLLC CG mode). When UE 415 receives the RRC configuration 420, the UE 415 may begin operating in the default CG mode. In some examples, the RRC configuration 420 may include a parameter indicating which CG mode is the default CG mode (e.g., the parameter may indicate whether URLLC is the default CG mode or NR-U is the default CG mode). Additionally or alternatively, the default CG mode may be determined prior to the RRC configuration 420 or otherwise be pre-configured. The UE 415 may utilize a first CG mode (e.g., default CG mode) to transmit one or more uplink messages to the base station 405 in the unlicensed radio frequency spectrum band using the first set of parameters associated with the first CG mode.

In some cases, the UE 415 may be operating according to the URLLC CG mode and the UE 415 may determine an interference condition (e.g., a quantity of LBT failures). For example, the UE 415 may determine an interference condition associated with uplink communications in the unlicensed radio frequency spectrum band. Upon determining that the interference condition satisfies a threshold, the UE 415 may transmit a control message (e.g., MAC CE 430-a) requesting an update to a UE operation mode from the first configured UE operation mode to the second configured UE operation mode. As depicted herein, the UE 415 transmits a MAC CE 430-a to the base station 405 to indicate a request to switch from a first CG mode (e.g., default CG mode) to a second CG mode (e.g., switch from the URLLC CG mode to the NR-U CG mode). When the UE 415 receives a control message (e.g., MAC CE 430-*b*) from the base station 405, the UE 415 may transmit a feedback message.

In some examples, the feedback message may indicate that the UE is to switch from communicating according to the first configured UE operation mode to communicating according to the second configured UE operation mode. The feedback message thus indicates that the UE 415 is to switch from communicating according to the first CG mode to communicating according to the second CG mode. As depicted in the example of FIG. 4, the UE 415 may transmit a PUCCH 435 that includes HARQ-ACK information corresponding to the PDSCH carrying the MAC CE 430-*b* to the base station 405 to acknowledge the change in CG mode indicated in the MAC CE 430-*b*. In some cases, the UE 415 may refrain from switching from the default CG mode to the second CG mode for a quantity of slots after transmitting the PUCCH 435. That is, the UE 415 may transmit the feedback message a first time slot (e.g., slot n) and the uplink messages using the second CG mode may be transmitted during a second time slot. The second time slot may be at least a threshold number of time slots after the first time slot. For example, if the PUCCH 435 is transmitted in a slot n, the UE 415 may refrain from switching from the default CG mode to the second mode until a slot $$n + 3N_{slot}^{subframe,\mu},$$

where N is a constant and μ is the SCS configuration for the PUCCH.

Figure 5:
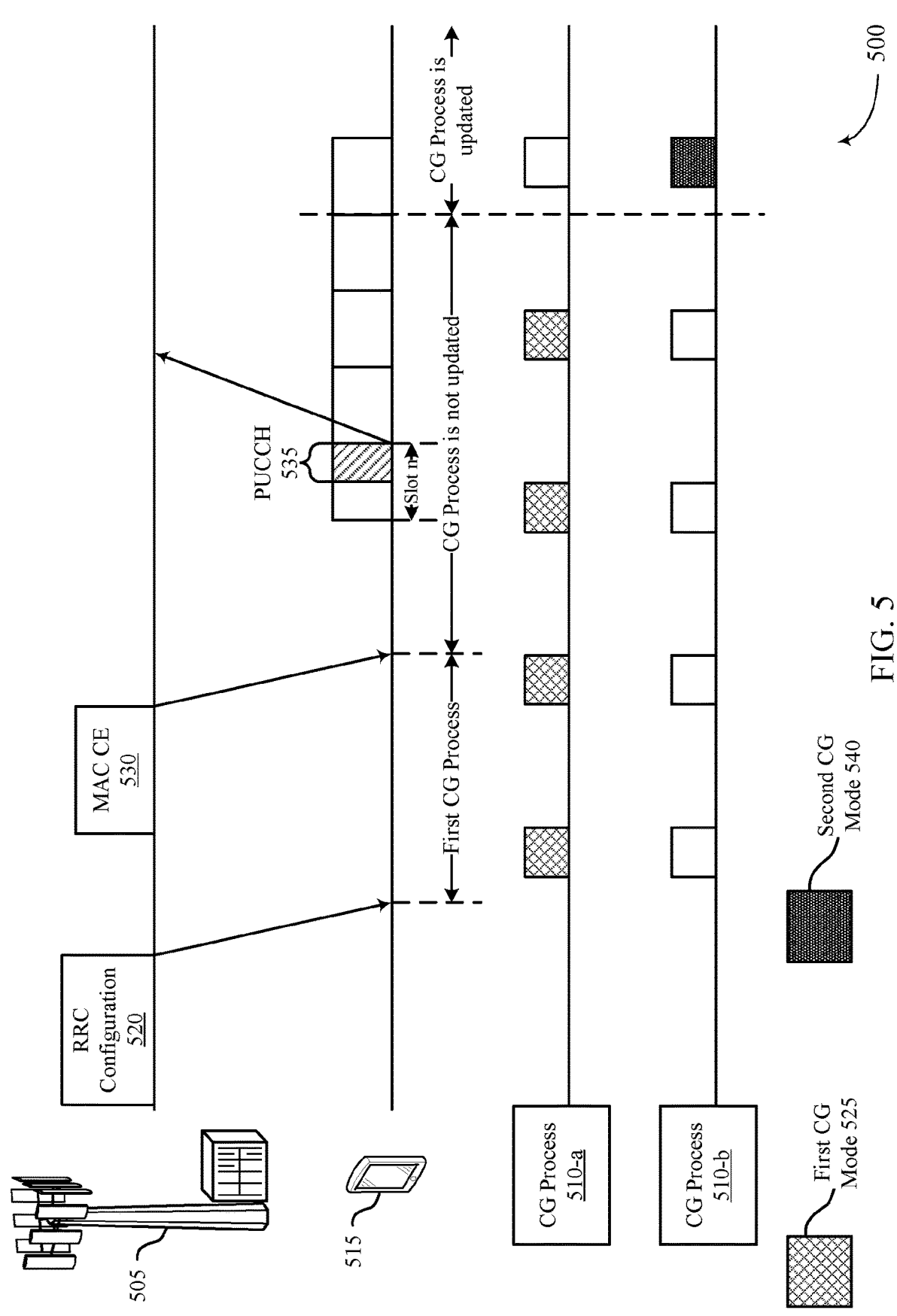
FIG. 5 illustrates an example of a process flow that supports techniques for switching between CG modes in accordance with aspects of the present disclosure.

FIG. 5 illustrates an example of a process flow 500 that supports techniques for switching between CG modes in accordance with aspects of the present disclosure. The process flow 500 may include a base station 505 and a UE 515, which may be an example of a base station 105 and a UE 115 described with reference to FIGS. 1 and 2.

In some examples, the base station 505 may dynamically determine to switch the CG process of the UE 515. For example, the base station 505 may transmit an RRC configuration 520 to the UE 515. The RRC configuration 520 may be an example of a control signaling (e.g., an RRC configuration) which configures the UE 515 with a first CG process 510-*a* and a second CG process 510-*b*. For example, the RRC configuration 520 may include a configuration for the first CG process 510-*a* with a URLLC CG mode (e.g., a CG retransmission timer is not configured) and the second CG process 510-*b* with a NR-U CG mode (e.g., the CG retransmission timer is configured). In some cases, the configuration for a URLLC CG process and a NR-U CG process may be determined by the network. The URLLC CG process may indicate a first set of parameters for the UE 515 to use for uplink communications in an unlicensed radio frequency spectrum band, and the NR-U CG mode may indicate a second set of parameters for the UE to use for uplink communications in the unlicensed radio frequency spectrum band. In some examples, the RRC configuration 520 (e.g., RRC parameter) may indicate the CG process to be used by the UE 515. Alternatively, the UE 515 may be configured with a default CG process.

As depicted herein, the UE 515 may be configured with multiple CG processes, each CG process may include one or multiple CG configurations. In some examples, each process operates according to a corresponding CG configuration which may indicate resources granted to the UE 515 for communication in the unlicensed radio frequency spectrum band. In some examples, more than one CG process may not be active at a time. According to one or more aspects, the base station 505 may use a MAC CE 530 to switch between the two modes (e.g., activate one mode and deactivate the other mode). For example, as depicted in the example of FIG. 5, the UE 515 may operate according to the CG processes 510 based on the received RRC configuration 520. In some examples, the CG processes 510 may include an indication of a default CG process (e.g., a URLLC CG process). When UE 515 receives the RRC configuration 520, the UE 515 may activate the default CG process. In some examples, the RRC configuration 520 may include a parameter indicating which CG mode is the default CG mode (e.g., the parameter may indicate whether URLLC is the default CG process or NR-U is the default CG process). Additionally or alternatively, the default CG process may be determined prior to the RRC configuration 520 or otherwise be pre-configured. The UE 515 may utilize a first CG process (e.g., default CG process) to transmit one or more uplink messages to the base station 505 in the unlicensed radio frequency spectrum band using the first set of parameters associated with the first CG process.

In some cases, it may be advantageous to switch the CG process of the UE 515. For example, the UE 515 may be operating according to the URLLC CG process and the base station may determine an interference condition (e.g., a quantity of LBT failures). Thus, the base station 505 may transmit a MAC CE 530 to the UE 515 to indicate that the UE 515 is to switch from a first CG process (e.g., default CG process) to a second CG process (e.g., deactivate the URLLC CG process and activate the NR-U CG process). When the UE receives a control message (e.g., MAC CE 530) from the base station 505, the UE 515 may transmit a feedback message. In some examples, the feedback message may indicate that the UE 515 is to switch from communicating according to the first CG process to communicating according to the second CG process. As depicted in the example of FIG. 5, the UE 515 may transmit a PUCCH 535 that includes HARQ-ACK information corresponding to the PDSCH carrying the MAC CE 530 to the base station 505 to acknowledge the change in CG process indicated in the MAC CE 530. In some cases, the UE may refrain from switching from the default CG process to the second CG process for a quantity of slots after transmitting the PUCCH 535. That is, the UE 515 may transmit the feedback message a first time slot (e.g., slot n) and the uplink messages using the second CG process may be transmitted during a second time slot. The second time slot may be at least a threshold number of time slots after the first time slot. For example, if the PUCCH 535 is transmitted in a slot n, the UE 515 may refrain from switching from the default CG process to the second process until a slot $$n + 3N_{slot}^{subframe,\mu},$$

where N is a constant and y is the SCS configuration for the PUCCH.

Figure 6:
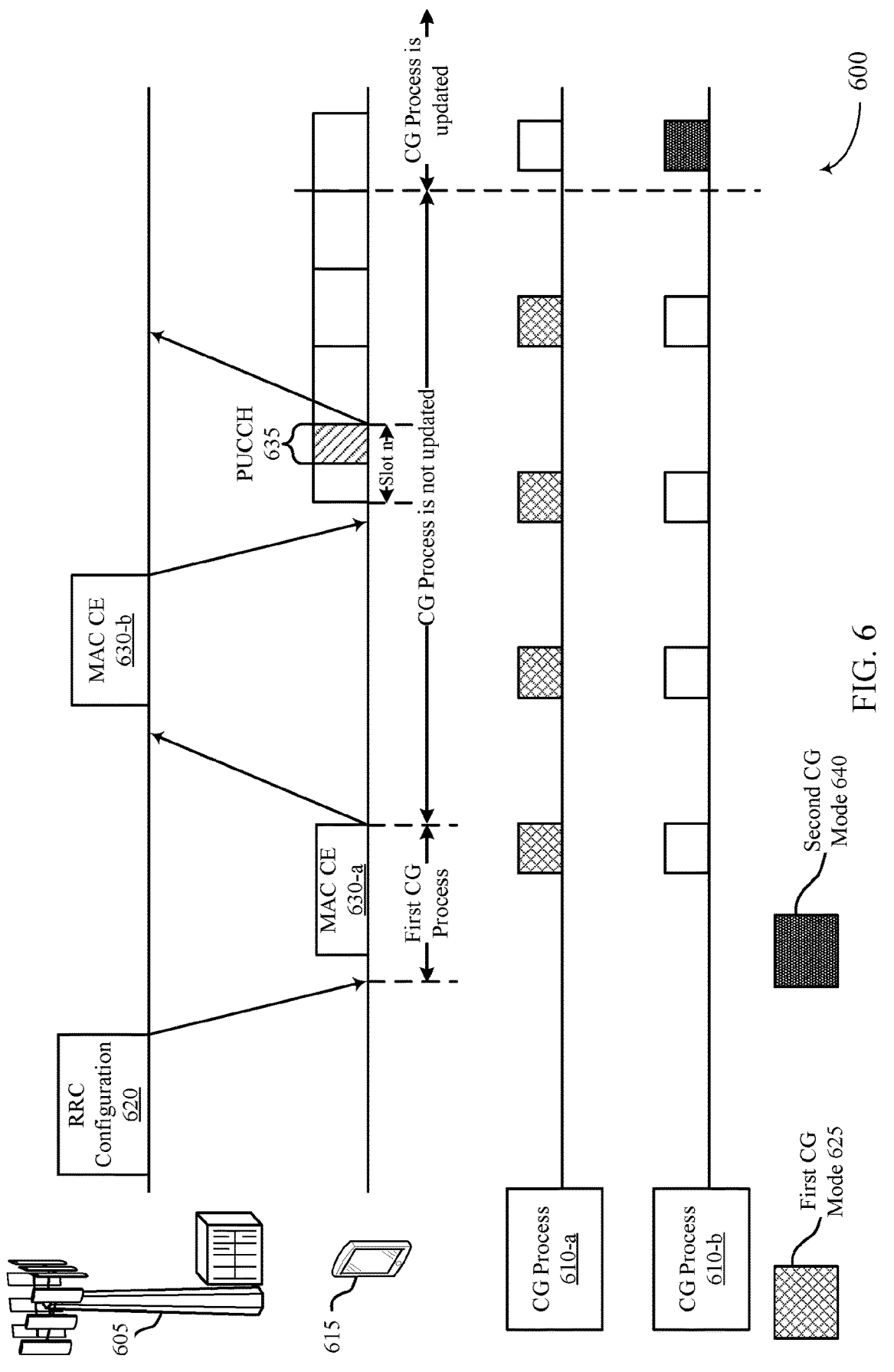
FIG. 6 illustrates an example of a process flow that supports techniques for switching between CG modes in accordance with aspects of the present disclosure.

FIG. 6 illustrates an example of a process flow 600 that supports techniques for switching between CG modes in accordance with aspects of the present disclosure. The process flow 600 may include a base station 605 and a UE 615, which may be an example of a base station 105 and a UE 115 described with reference to FIGS. 1 and 2.

According to one or more aspects of the present disclosure, the UE 615 may assist to dynamically determine to switch the CG process of the UE 615. For example, the base station 605 may transmit an RRC configuration 620 to the UE 615. The RRC configuration 620 may be an example of a control signaling (e.g., an RRC configuration) which configures the UE 615 with a first CG process 610-*a* and a second CG process 610-*b*. For example, the RRC configuration 620 may include a configuration for the first CG process 610-*a* with a URLLC CG mode (e.g., a CG retransmission timer is not configured) and the second CG process 610-*b* with a NR-U CG mode (e.g., the CG retransmission timer is configured). In some cases, the configuration for a URLLC CG mode and a NR-U CG mode may be determined by the network. The URLLC CG mode may indicate a first set of parameters for the UE 615 to use for uplink communications in an unlicensed radio frequency spectrum band, and the NR-U CG mode may indicate a second set of parameters for the UE to use for uplink communications in the unlicensed radio frequency spectrum band. In some examples, the RRC configuration 620 (e.g., RRC parameter) may indicate the CG process to be used by the UE 615. Alternatively, the UE 615 may be configured with a default CG process.

In some examples, the UE 615 may be configured with multiple CG processes, where each process operates according to a corresponding CG configuration which may indicate resources granted to the UE 615 for communication in the unlicensed radio frequency spectrum band. In some examples, more than one CG process may not be active at a time. According to one or more aspects, each UE may be configured with two CG process 610-*a* and 610-*b*, each CG process may include one or multiple CG configurations, and the UE 615 may use a MAC CE 630-*a* to request to switch between the two modes. As depicted in the example of FIG. 6, the UE 615 may operate according to the CG processes 610 based on the received RRC configuration 620. In some examples, the CG processes 610 may include an indication of a default CG process (e.g., a URLLC CG process). In some examples, when UE 615 receives the RRC configuration 620, the UE 615 may activate the default CG process. In some examples, the RRC configuration 620 may include a parameter indicating which CG process is the default CG process (e.g., the parameter may indicate whether URLLC is the default CG process or NR-U is the default CG process). Additionally or alternatively, the default CG process may be determined prior to the RRC configuration 620 or otherwise be pre-configured. The UE 615 may utilize a first CG process (e.g., default CG process) to transmit one or more uplink messages to the base station 605 in the unlicensed radio frequency spectrum band using the first set of parameters associated with the first CG process.

As depicted herein, it may be advantageous to switch the CG process of the UE 615. For example, the UE 615 may be operating according to the URLLC CG process and may determine an interference condition (e.g., a quantity of LBT failures). Thus, the UE 615 may transmit a MAC CE 630-*a* to the base station 605 to indicate a request to switch from a first CG process (e.g., default CG process) to a second CG process (e.g., switch from the URLLC CG process to the NR-U CG process). When the UE receives a control message (e.g., MAC CE 630-*b*) from the base station 605, the UE 615 may transmit a feedback message. In some examples, the feedback message may indicate that the UE 615 is to switch from communicating according to the first CG process to communicating according to the second CG process. As depicted in the example of FIG. 6, the UE 615 may transmit a PUCCH 635 that includes HARQ-ACK information corresponding to the PDSCH carrying the MAC CE 630-*b* to the base station 505 to acknowledge the change in CG process indicated in the MAC CE 630-*b*. In some cases, the UE may refrain from switching from the default CG process to the second CG process for a quantity of slots after transmitting the PUCCH 635. That is, the UE 615 may transmit the feedback message a first time slot (e.g., slot n) and the uplink messages using the second CG process may be transmitted during a second time slot. The second time slot may be at least a threshold number of time slots after the first time slot. For example, if the PUCCH 635 is transmitted in a slot n, the UE 615 may refrain from switching from the default CG process to the second process until a slot $$n + 3N_{slot}^{subframe,\mu},$$

where N is a constant and y is the SCS configuration for the PUCCH.

Figures 7A, 7B, 7C, 7D:
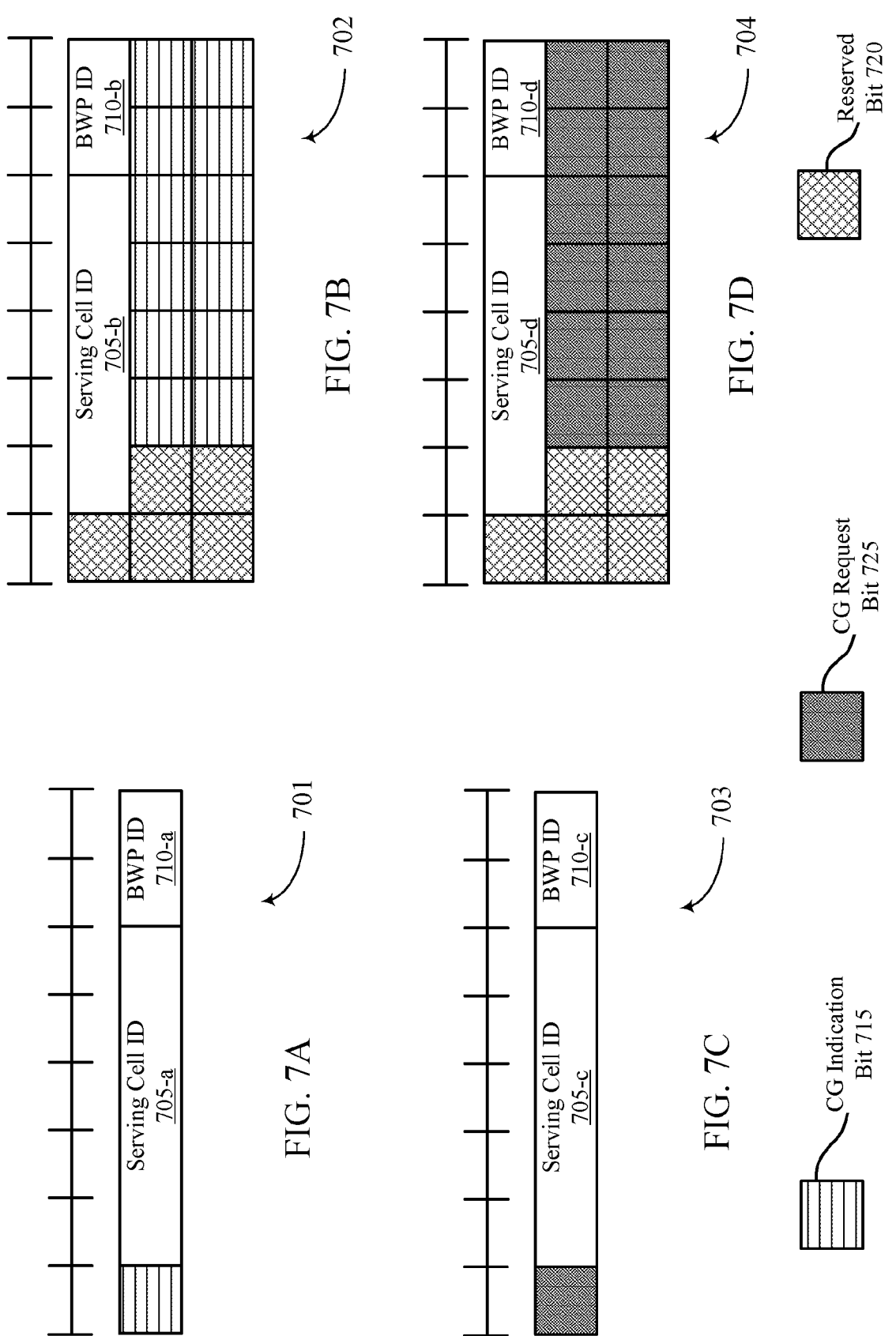
FIGS. 7A-7D illustrate examples of control elements that support techniques for switching between CG modes in accordance with aspects of the present disclosure.

FIGS. 7A-7D illustrate example of control elements that support techniques for switching between CG modes in accordance with aspects of the present disclosure. FIG. 7A illustrates an example of a MAC CE 701 that supports techniques for switching between CG modes in accordance with aspects of the present disclosure. The MAC CE 701 may include a serving cell ID 705-*a*, a BWP ID 710-*a*, and a CG indication bit 715.

In some examples, the MAC CE 701 may be transmitted by a base station to indicate the CG mode to the UE. In some cases, the UE may operate in a default CG mode at a time instance. In such cases, the CG indication bit 715 (which may also be referred to as a flag, such as a CG flag, in some examples) may indicate the CG mode for all CG configurations in a BWP of a component carrier (CC). In some examples, if the CG indication bit 715 is set to zero, then the URLLC CG mode may be indicated, and if the CG indication bit 715 is set to one, then the NR-U CG mode may be indicated. In some examples, the indication of the MAC CE 701 includes at least a bit indicating for the UE to switch a UE operation mode, a bit field indicating an identity of a serving cell associated with the UE operation mode switch, and a bit field indicating an identity of a BWP associated with the UE operation mode switch.

Additionally or alternatively, the MAC CE 701 may indicate which CG process is activated for a BWP of a CC. For example, the CG indication bit 715 may indicate the CG process for the BWP of the CC. For type 1 CG, the CG configurations associated with the active CG process may be used by the UE. For type 2 CG, the active CG configurations associated with the active CG process may be used by the UE.

FIG. 7B illustrates an example of a MAC CE 702 that supports techniques for switching between CG modes in accordance with aspects of the present disclosure. The MAC CE 701 may include a serving cell ID 705-*b*, a BWP ID 710-*b*, a bitmap including a set of CG indication bits 715, and a set of reserved bits 720.

In some examples, the MAC CE 702 be transmitted by a base station to a UE to indicate the CG mode to the UE. In some cases, the UE may operate in a plurality of CG mode at a time instance. In such cases, the bitmap that includes the set of CG indication bits 715 may indicate the CG mode for each CG configuration in a BWP of a CC. For example, each CG indication bit 715 of the bitmap may indicate the CG mode for a CG configuration. If the CG indication bit 715 corresponding to a CG configuration is set to zero, then the URLLC CG mode for that CG configuration may be indicated, while if the CG indication bit 715 corresponding to a CG configuration is set to one, then the NR-U CG mode for that CG configuration may be indicated. As shown herein, the MAC CE 702 may include at least a bitmap indicating an operation mode switch for each configuration of CG resources, a bit field indicating an identity of a serving cell associated with the UE operation mode switch, and a bit field indicating an identity of a BWP associated with the UE operation mode switch.

Additionally or alternatively, the MAC CE 702 may indicate which CG process is activated for a BWP of a CC. For example, the bitmap that includes CG indication bits 715 may indicate whether the CG configuration for a CG process is activated. For example, if a CG configuration is activated and the CG configuration is associated with a CG process (e.g., URLLC CG mode), then the CG configuration may be activated with URLLC CG mode.

FIG. 7C illustrates an example of a MAC CE 703 that supports techniques for switching between CG modes in accordance with aspects of the present disclosure. The MAC CE 703 may include a serving cell ID 705-a, a BWP ID 710-a, and a CG request bit 725 (which may also be referred to as a flag, such as a request flag or CG request flag, in some examples). As depicted in the example of FIG. 7C, the MAC CE 703 may indicate a request to switch which CG process is activated for a BWP of a CC. For example, the CG request bit 725 may indicate a request to switch the CG process for the BWP of the CC.

In some examples, the MAC CE 703 may be transmitted by a UE to a base station to request to switch the CG mode of the UE. The MAC CE 703 may include at least a bitmap indicating a request to switch a UE operation mode for each configuration of resources, a bit field indicating an identity of a serving cell associated with the request, and a bit field indicating an identity of a BWP associated with the request. In some cases, the request to switch the CG mode for all CGs of a CC. In such cases, the CG request bit 725 may indicate a request to switch the CG mode of the UE. For example, if the CG request bit 725 is set to zero, the UE may not request a change in CG mode, while if the CG request bit 725 is set to one, the UE may request a change in CG mode.

FIG. 7D illustrates an example of a MAC CE 704 that supports techniques for switching between CG modes in accordance with aspects of the present disclosure. The MAC CE 704 may include a serving cell ID 705-d, a BWP ID 710-d, a bitmap that may include a set of CG request bits 725, and a set of reserved bits 720.

In some examples, the MAC CE 704 may be transmitted by a UE to a base station to request to switch the CG mode of the UE. As depicted herein, the MAC CE 704 may include at least a bit indicating a request to switch a UE operation mode, a bitmap indicating a request to switch a UE operation mode for each configuration of resources, a bit field indicating an identity of a serving cell associated with the request, and a bit field indicating an identity of a BWP associated with the request. In some cases, the UE may request a CG mode switch for one or multiple CGs in a BWP of a CC. In such cases, the bitmap that includes the set of CG request bits 725 may indicate the CG mode for each CG configuration in a BWP of a CC. For example, each CG request bit 725 of the bitmap may indicate the CG mode for a configuration. If the CG request bit 725 corresponding to a configuration is set to zero, the UE may not request a change in CG mode, while if the CG request bit 725 corresponding to a configuration is set to one, the UE may request a change in CG mode.

Figure 8:
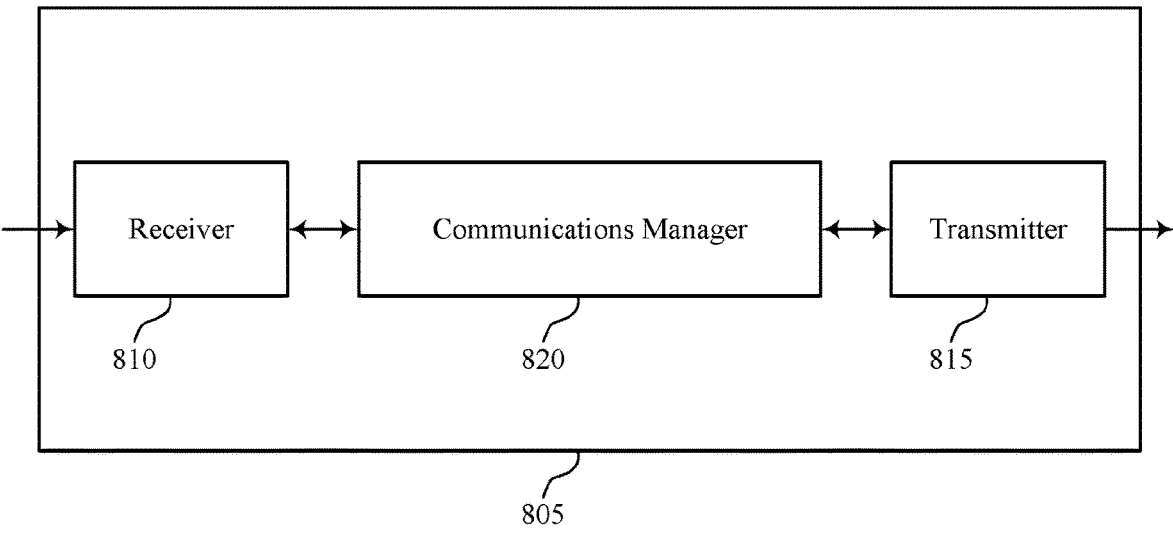
FIGS. 8 and 9 show block diagrams of devices that support techniques for switching between CG modes in accordance with aspects of the present disclosure.

FIG. 8 shows a block diagram 800 of a device 805 that supports techniques for switching between CG modes in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for switching between CG modes). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for switching between CG modes). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for switching between CG modes as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The communications manager 820 may be configured as or otherwise support a means for transmitting one or more uplink messages to the base station in the unlicensed radio frequency spectrum band using the first set of parameters. The communications manager 820 may be configured as or otherwise support a means for receiving a control message including an indication that the UE is to switch from communicating according to the first configured UE operation mode to communicating according to the second configured UE operation mode. The communications manager 820 may be configured as or otherwise support a means for transmitting, in response to the received indication, one or more uplink messages to the base station in the unlicensed radio frequency spectrum band using the second set of parameters according to the second UE operation mode.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced power consumption, more efficient utilization of communication resources.

Figure 9:
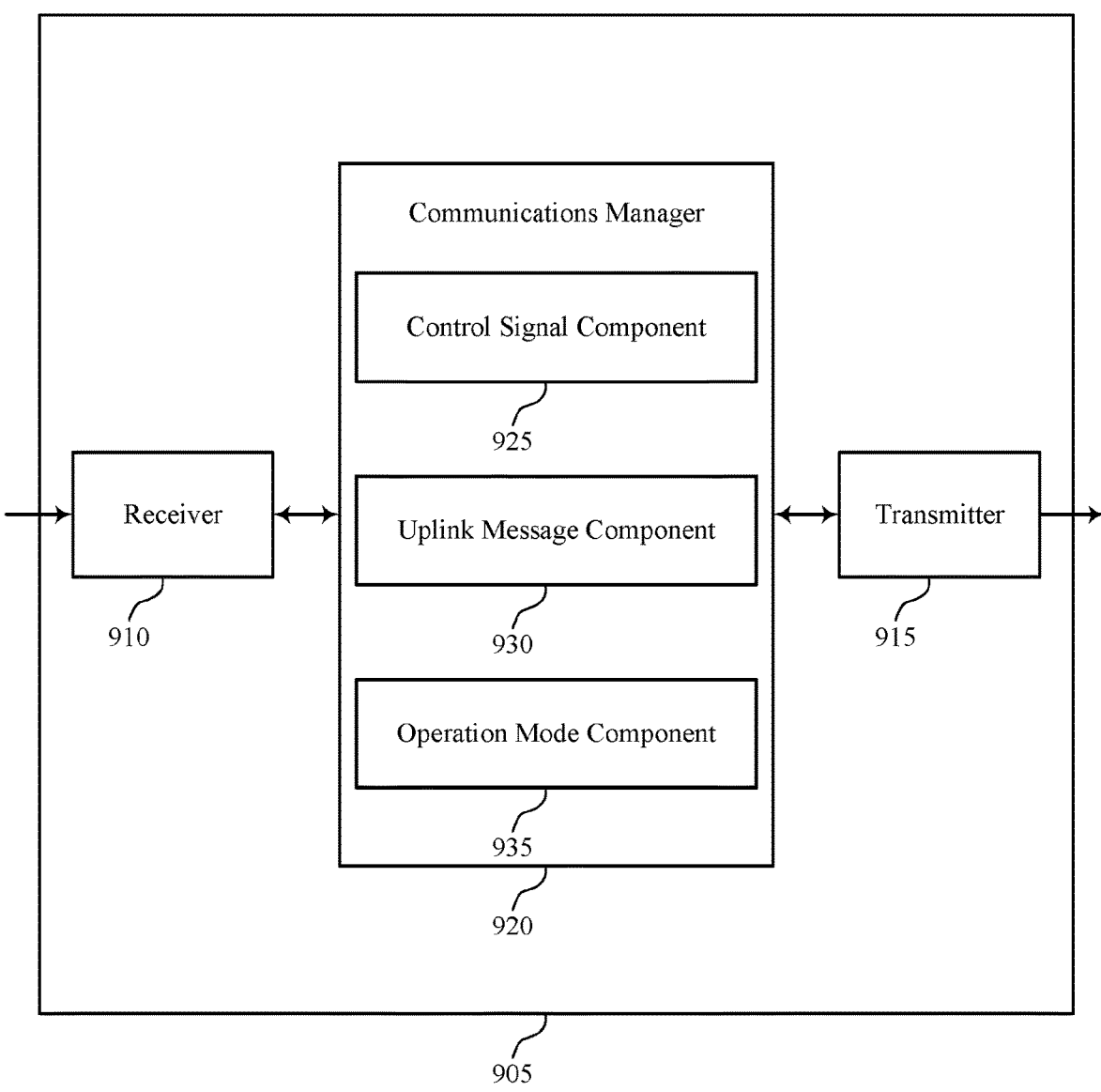

FIG. 9 shows a block diagram 900 of a device 905 that supports techniques for switching between CG modes in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for switching between CG modes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for switching between CG modes). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for switching between CG modes as described herein. For example, the communications manager 920 may include a control signal component 925, an uplink message component 930, an operation mode component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The control signal component 925 may be configured as or otherwise support a means for receiving, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The uplink message component 930 may be configured as or otherwise support a means for transmitting one or more uplink messages to the base station in the unlicensed radio frequency spectrum band using the first set of parameters.

The operation mode component 935 may be configured as or otherwise support a means for receiving a control message including an indication that the UE is to switch from communicating according to the first configured UE operation mode to communicating according to the second configured UE operation mode. The uplink message component 930 may be configured as or otherwise support a means for transmitting, in response to the received indication, one or more uplink messages to the base station in the unlicensed radio frequency spectrum band using the second set of parameters according to the second UE operation mode.

Figure 10:
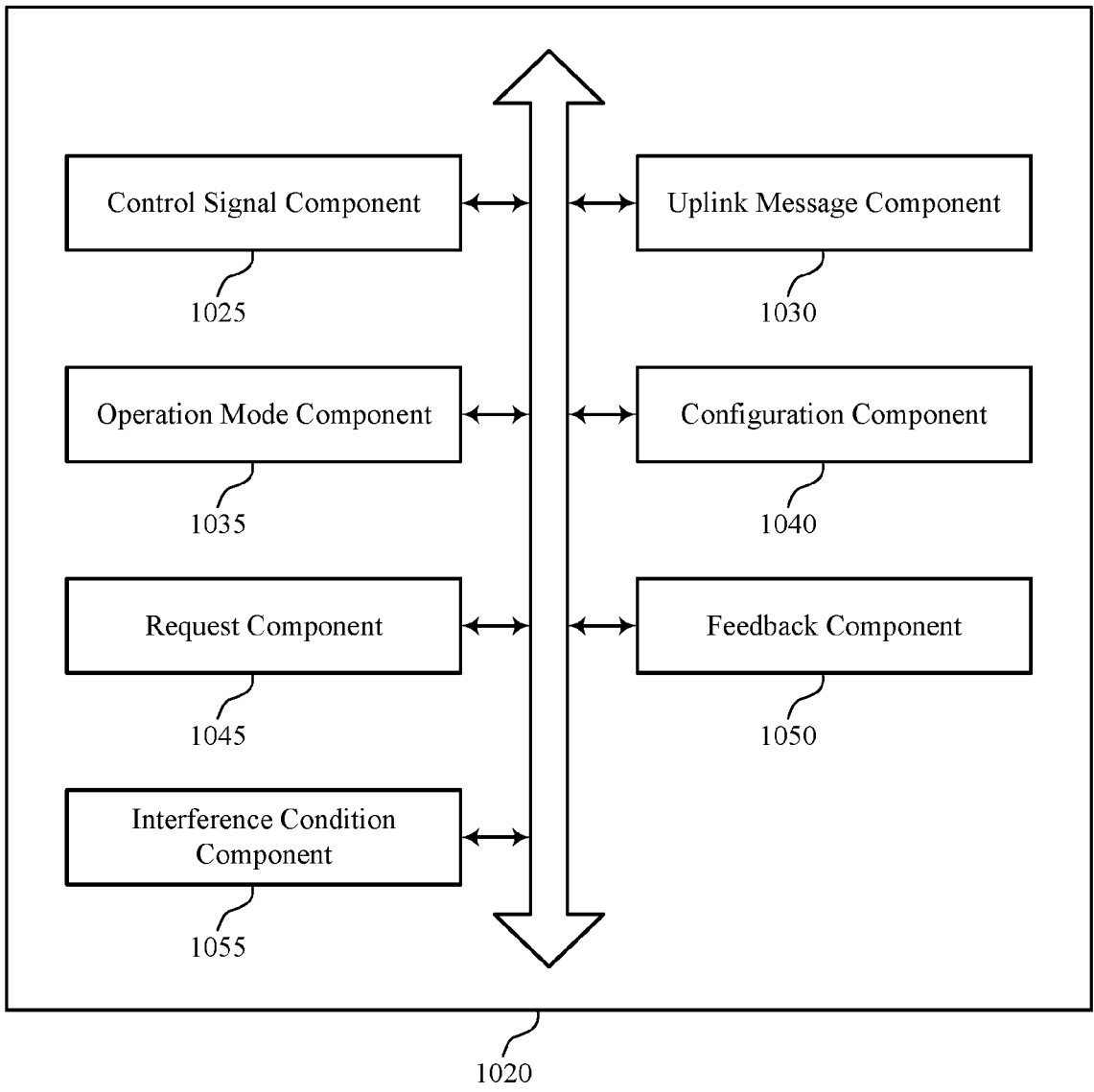
FIG. 10 shows a block diagram of a communications manager that supports techniques for switching between CG modes in accordance with aspects of the present disclosure.

FIG. 10 shows a block diagram 1000 of a communications manager 1020 that supports techniques for switching between CG modes in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for switching between CG modes as described herein. For example, the communications manager 1020 may include a control signal component 1025, an uplink message component 1030, an operation mode component 1035, a configuration component 1040, a request component 1045, a feedback component 1050, an interference condition component 1055, or any combination thereof. Each of these components may communicate, directly or indirectly, with one another (e.g., via one or more buses).

The communications manager 1020 may support wireless communication at a UE in accordance with examples as disclosed herein. The control signal component 1025 may be configured as or otherwise support a means for receiving, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band.

The uplink message component 1030 may be configured as or otherwise support a means for transmitting one or more uplink messages to the base station in the unlicensed radio frequency spectrum band using the first set of parameters. The operation mode component 1035 may be configured as or otherwise support a means for receiving a control message including an indication that the UE is to switch from communicating according to the first configured UE operation mode to communicating according to the second configured UE operation mode. In some examples, the uplink message component 1030 may be configured as or otherwise support a means for transmitting, in response to the received indication, one or more uplink messages to the base station in the unlicensed radio frequency spectrum band using the second set of parameters according to the second UE operation mode.

In some examples, to support receiving the control signaling, the configuration component 1040 may be configured as or otherwise support a means for receiving a configuration indicating resources granted to the UE for communication in the unlicensed radio frequency spectrum band, the configuration associated with at least the first UE operation mode and the second UE operation mode.

In some examples, to support receiving the control signaling, the configuration component 1040 may be configured as or otherwise support a means for receiving a first configuration indicating resources granted to the UE for communication in the unlicensed radio frequency spectrum band according to the first set of parameters, the first configuration of resources being associated with the first UE operation mode. In some examples, to support receiving the control signaling, the configuration component 1040 may be configured as or otherwise support a means for receiving a second configuration indicating resources granted to the UE for communication in the unlicensed radio frequency spectrum band according to the second set of parameters, the second configuration of resources being associated with the second UE operation mode.

In some examples, the request component 1045 may be configured as or otherwise support a means for transmitting a request to update to a UE operation mode from the first configured UE operation mode to the second configured UE operation mode, where receiving the control message is at least in part in response to transmitting the request.

In some examples, the request includes at least a bit indicating a request to switch a UE operation mode, a bit field indicating an identity of a serving cell associated with the request, and a bit field indicating an identity of a BWP associated with the request. In some examples, the request includes at least a bitmap indicating a request to switch a UE operation mode for each configuration of resources, a bit field indicating an identity of a serving cell associated with the request, and a bit field indicating an identity of a BWP associated with the request.

In some examples, the feedback component 1050 may be configured as or otherwise support a means for transmitting, to the base station, a feedback message in response to receiving the control message, the feedback message indicating that the UE is to switch from communicating according to the first configured UE operation mode to communicating according to the second configured UE operation mode.

In some examples, the feedback message is transmitted during a first time slot and the uplink messages using the second set of parameters according to the second UE operation mode are transmitted during a second time slot. In some examples, the second time slot is at least a threshold number of time slots after the first time slot.

In some examples, the interference condition component 1055 may be configured as or otherwise support a means for determining an interference condition associated with uplink communications in the unlicensed radio frequency spectrum band. In some examples, the operation mode component 1035 may be configured as or otherwise support a means for transmitting, based on the interference condition satisfying a threshold, a second control message requesting an update to a UE operation mode from the first configured UE operation mode to the second configured UE operation mode. In some examples, at least the first UE operation mode and the second UE operation mode is associated with a reconfiguration timer.

In some examples, the operation mode component 1035 may be configured as or otherwise support a means for receiving, from the base station, an indication of a default UE operation mode that includes one of the first UE operation mode or the second UE operation mode. In some examples, the indication of the control message includes at least a bit indicating for the UE to switch a UE operation mode, a bit field indicating an identity of a serving cell associated with the UE operation mode switch, and a bit field indicating an identity of a BWP associated with the UE operation mode switch.

In some examples, the indication of the control message includes at least a bitmap indicating an operation mode switch for each configuration of resources, a bit field indicating an identity of a serving cell associated with the UE operation mode switch, and a bit field indicating an identity of a BWP associated with the UE operation mode switch. In some examples, the first UE operation mode includes an URLLC operation mode, and the second UE operation mode includes an NR-U operation mode.

Figure 11:
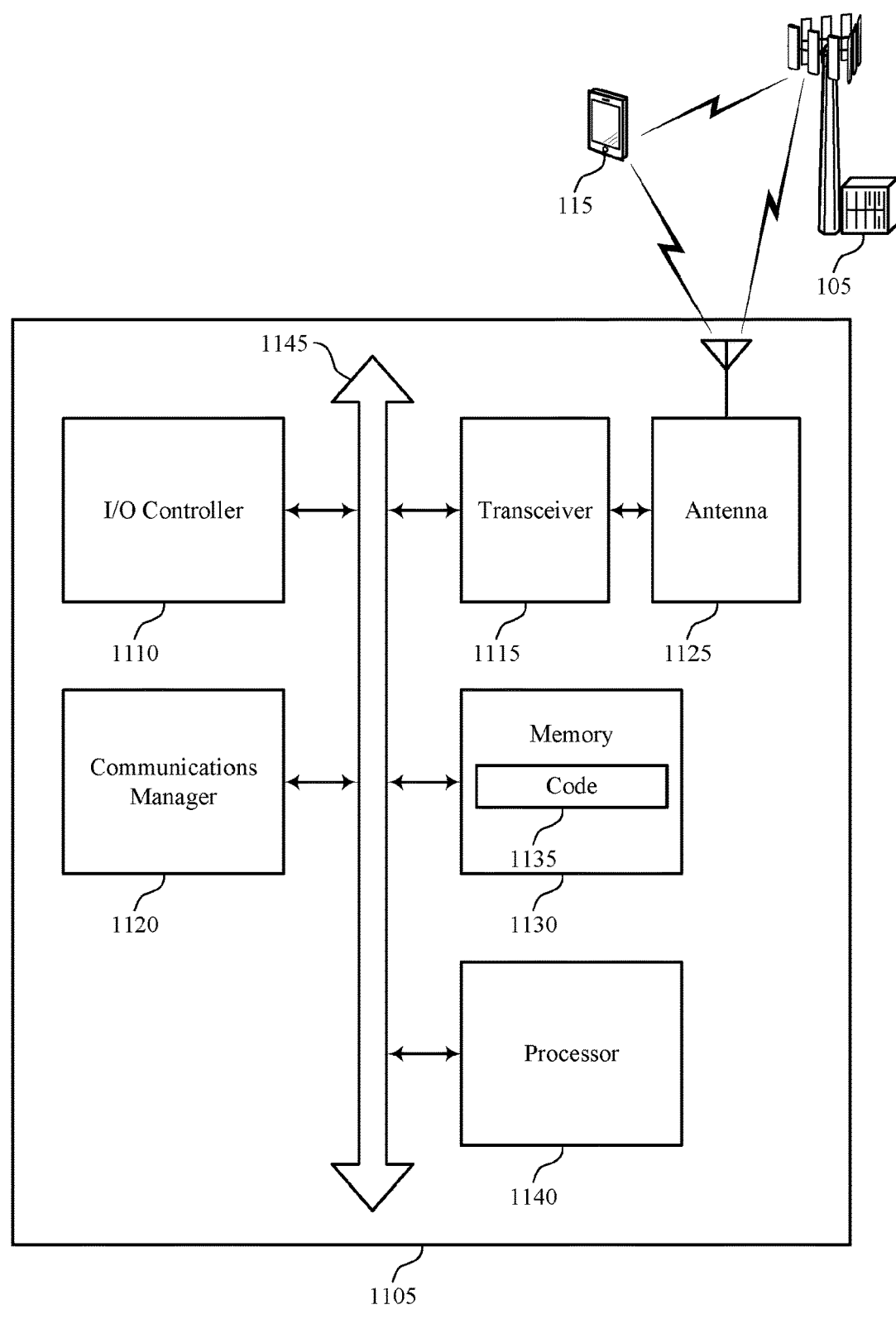
FIG. 11 shows a diagram of a system including a device that supports techniques for switching between CG modes in accordance with aspects of the present disclosure.

FIG. 11 shows a diagram of a system 1100 including a device 1105 that supports techniques for switching between CG modes in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for switching between CG modes). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The communications manager 1120 may be configured as or otherwise support a means for transmitting one or more uplink messages to the base station in the unlicensed radio frequency spectrum band using the first set of parameters. The communications manager 1120 may be configured as or otherwise support a means for receiving a control message including an indication that the UE is to switch from communicating according to the first configured UE operation mode to communicating according to the second configured UE operation mode. The communications manager 1120 may be configured as or otherwise support a means for transmitting, in response to the received indication, one or more uplink messages to the base station in the unlicensed radio frequency spectrum band using the second set of parameters according to the second UE operation mode.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for switching between CG modes as described herein, or the processor 1140 and the memory 1130 may be otherwise configured to perform or support such operations.

Figure 12:
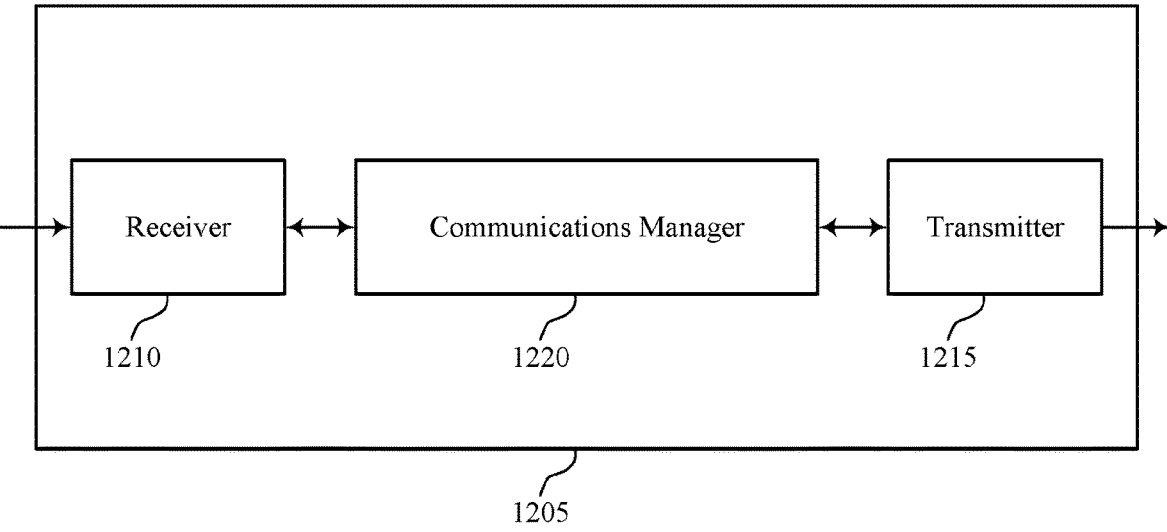
FIGS. 12 and 13 show block diagrams of devices that support techniques for switching between CG modes in accordance with aspects of the present disclosure.

FIG. 12 shows a block diagram 1200 of a device 1205 that supports techniques for switching between CG modes in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for switching between CG modes). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for switching between CG modes). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of techniques for switching between CG modes as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The communications manager 1220 may be configured as or otherwise support a means for receiving one or more uplink messages from the UE in the unlicensed radio frequency spectrum band using the first set of parameters. The communications manager 1220 may be configured as or otherwise support a means for transmitting a control message including an indication that the UE is to switch from communicating according to the first configured UE operation mode to communicating according to the second configured UE operation mode. The communications manager 1220 may be configured as or otherwise support a means for receiving, in response to the transmitted indication, one or more uplink messages from the UE in the unlicensed radio frequency spectrum band using the second set of parameters according to the second UE operation mode.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced processing, reduced power consumption, more efficient utilization of communication resources.

Figure 13:
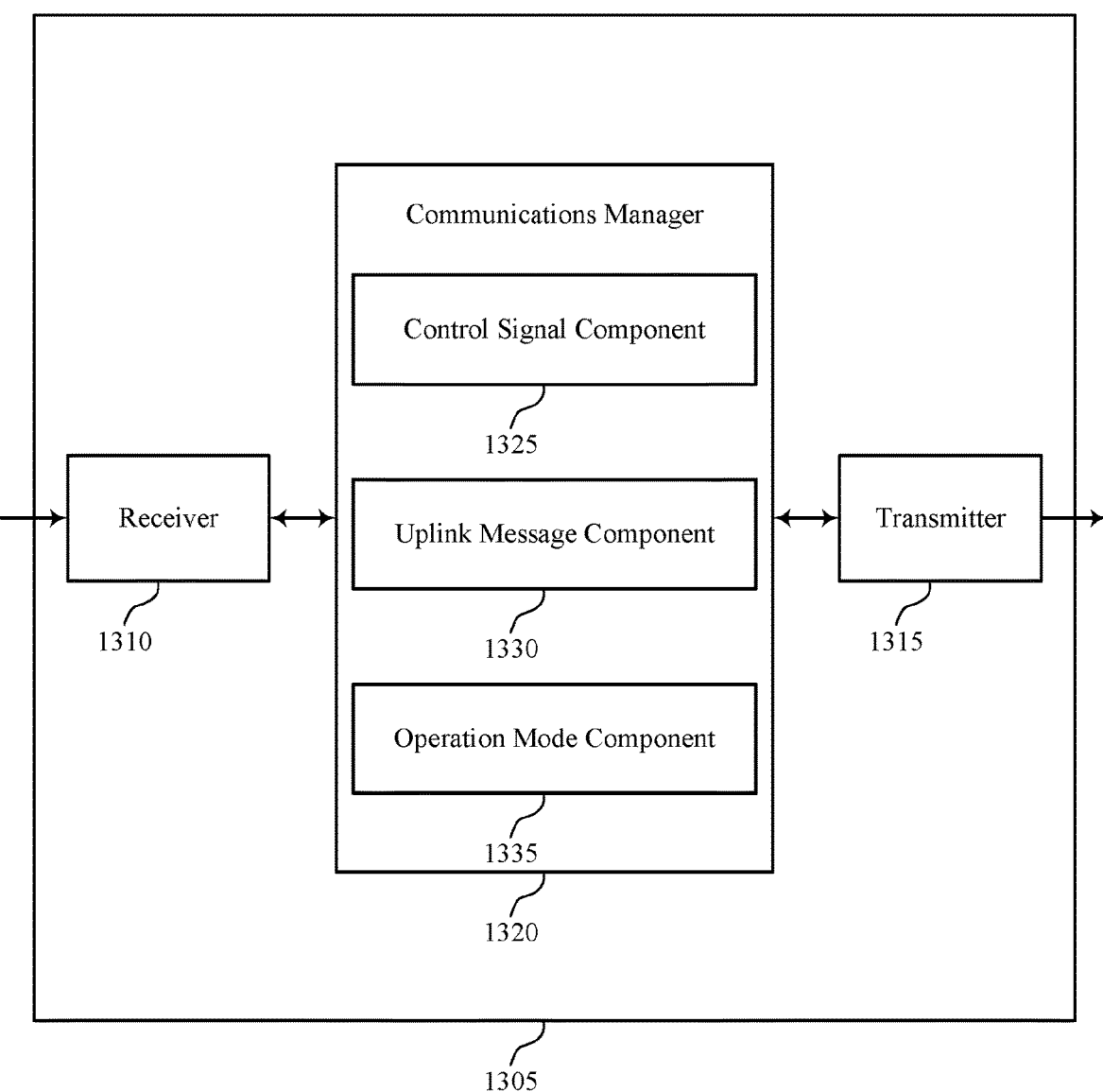

FIG. 13 shows a block diagram 1300 of a device 1305 that supports techniques for switching between CG modes in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for switching between CG modes). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for switching between CG modes). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of techniques for switching between CG modes as described herein. For example, the communications manager 1320 may include a control signal component 1325, an uplink message component 1330, an operation mode component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The control signal component 1325 may be configured as or otherwise support a means for transmitting, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The uplink message component 1330 may be configured as or otherwise support a means for receiving one or more uplink messages from the UE in the unlicensed radio frequency spectrum band using the first set of parameters.

The operation mode component 1335 may be configured as or otherwise support a means for transmitting a control message including an indication that the UE is to switch from communicating according to the first configured UE operation mode to communicating according to the second configured UE operation mode. The uplink message component 1330 may be configured as or otherwise support a means for receiving, in response to the transmitted indication, one or more uplink messages from the UE in the unlicensed radio frequency spectrum band using the second set of parameters according to the second UE operation mode.

Figure 14:
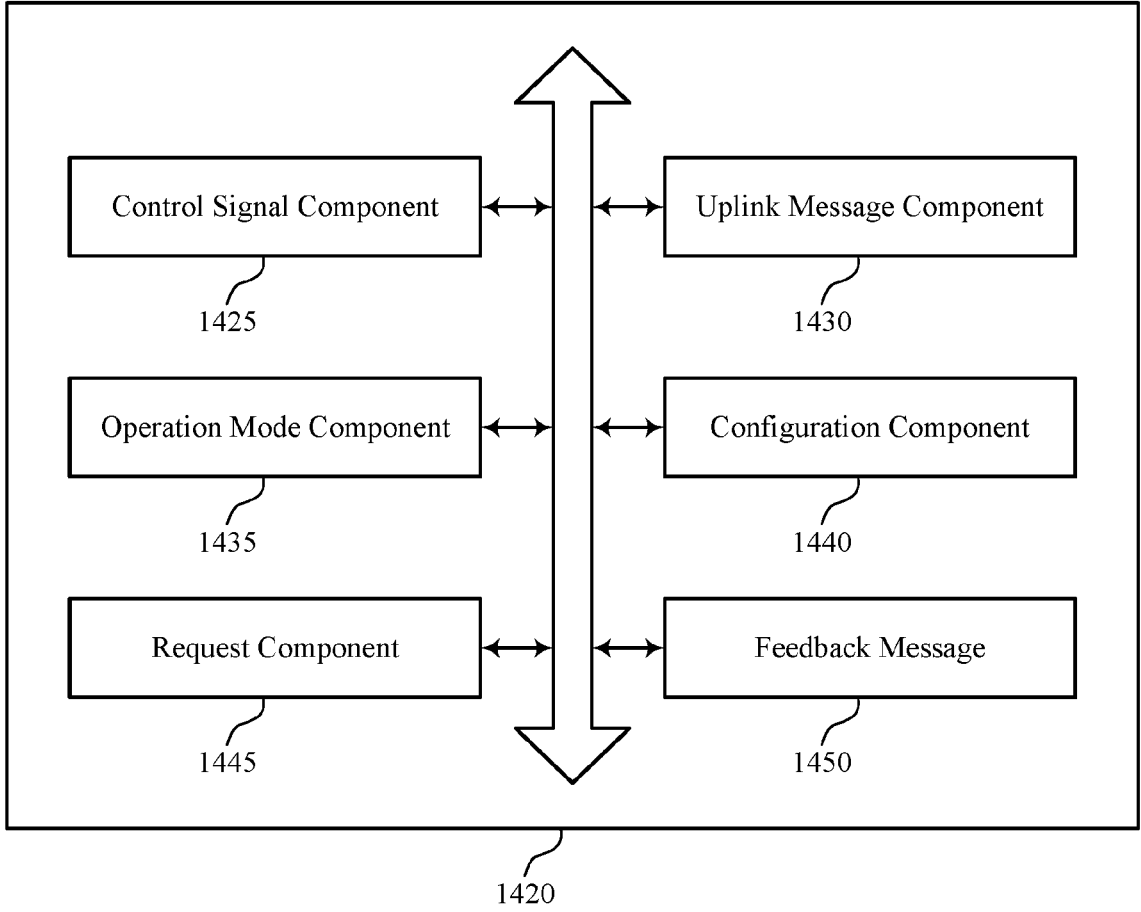
FIG. 14 shows a block diagram of a communications manager that supports techniques for switching between CG modes in accordance with aspects of the present disclosure.

FIG. 14 shows a block diagram 1400 of a communications manager 1420 that supports techniques for switching between CG modes in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of techniques for switching between CG modes as described herein. For example, the communications manager 1420 may include a control signal component 1425, an uplink message component 1430, an operation mode component 1435, a configuration component 1440, a request component 1445, a feedback message 1450, or any combination thereof. Each of these components may communicate, directly or indirectly, with one another (e.g., via one or more buses).

The communications manager 1420 may support wireless communication at a base station in accordance with examples as disclosed herein. The control signal component 1425 may be configured as or otherwise support a means for transmitting, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The uplink message component 1430 may be configured as or otherwise support a means for receiving one or more uplink messages from the UE in the unlicensed radio frequency spectrum band using the first set of parameters.

The operation mode component 1435 may be configured as or otherwise support a means for transmitting a control message including an indication that the UE is to switch from communicating according to the first configured UE operation mode to communicating according to the second configured UE operation mode. In some examples, the uplink message component 1430 may be configured as or otherwise support a means for receiving, in response to the transmitted indication, one or more uplink messages from the UE in the unlicensed radio frequency spectrum band using the second set of parameters according to the second UE operation mode.

In some examples, to support transmitting the control signaling, the configuration component 1440 may be configured as or otherwise support a means for a configuration indicating resources granted to the UE for communication in the unlicensed radio frequency spectrum band, the configuration associated with at least the first UE operation mode and the second UE operation mode.

In some examples, to support transmitting the control signaling, the configuration component 1440 may be configured as or otherwise support a means for transmitting a first configuration indicating resources granted to the UE for communication in the unlicensed radio frequency spectrum band according to the first set of parameters, the first configuration of resources being associated with the first UE operation mode. In some examples, to support transmitting the control signaling, the configuration component 1440 may be configured as or otherwise support a means for transmitting a second configuration indicating resources granted to the UE for communication in the unlicensed radio frequency spectrum band according to the second set of parameters, the second configuration of resources being associated with the second UE operation mode.

In some examples, the request component 1445 may be configured as or otherwise support a means for receiving a request to update to a UE operation mode from the first configured UE operation mode to the second configured UE operation mode, where transmitting the control message is at least in part in response to receiving the request.

In some examples, the request includes at least a bit indicating a request to switch a UE operation mode, a bitmap indicating a request to switch a UE operation mode for each configuration of resources, a bit field indicating an identity of a serving cell associated with the request, and a bit field indicating an identity of a BWP associated with the request.

In some examples, the feedback message 1450 may be configured as or otherwise support a means for receiving, from the UE, a feedback message in response to transmitting the control message, the feedback message indicating that the UE is to switch from communicating according to the first configured UE operation mode to communicating according to the second configured UE operation mode.

In some examples, at least the first UE operation mode and the second UE operation mode is associated with a reconfiguration timer. In some examples, the operation mode component 1435 may be configured as or otherwise support a means for transmitting, to the UE, an indication of a default UE operation mode that includes one of the first UE operation mode or the second UE operation mode.

In some examples, the indication of control message includes at least a bit indicating for the UE to switch a UE operation mode, a bitmap indicating an operation mode switch for each configuration of resources, a bit field indicating an identity of a serving cell associated with the UE operation mode switch, and a bit field indicating an identity of a BWP associated with the UE operation mode switch.

Figure 15:
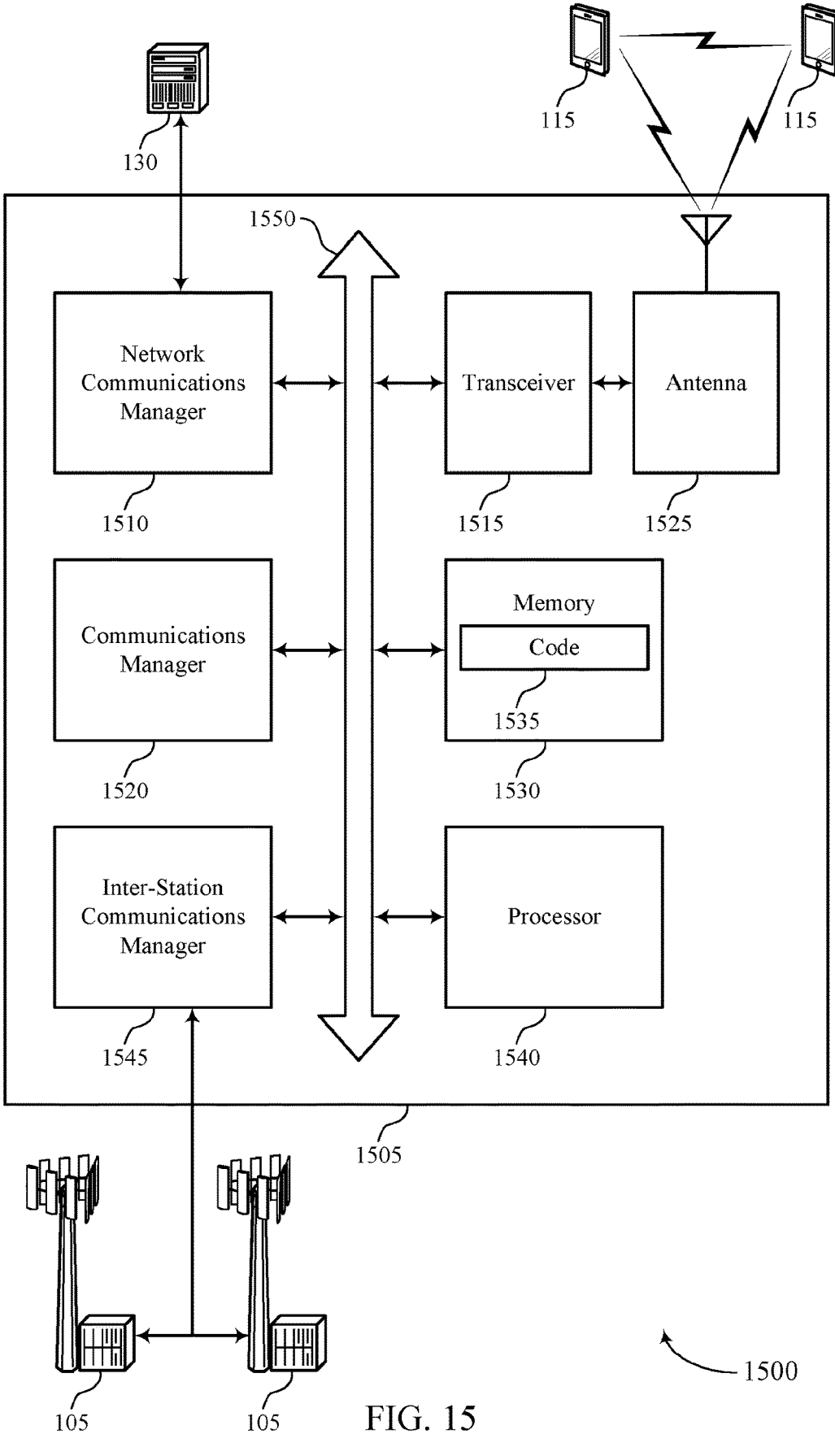
FIG. 15 shows a diagram of a system including a device that supports techniques for switching between CG modes in accordance with aspects of the present disclosure.

FIG. 15 shows a diagram of a system 1500 including a device 1505 that supports techniques for switching between CG modes in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for switching between CG modes). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The communications manager 1520 may be configured as or otherwise support a means for receiving one or more uplink messages from the UE in the unlicensed radio frequency spectrum band using the first set of parameters. The communications manager 1520 may be configured as or otherwise support a means for transmitting a control message including an indication that the UE is to switch from communicating according to the first configured UE operation mode to communicating according to the second configured UE operation mode. The communications manager 1520 may be configured as or otherwise support a means for receiving, in response to the transmitted indication, one or more uplink messages from the UE in the unlicensed radio frequency spectrum band using the second set of parameters according to the second UE operation mode.

By including or configuring the communications manager 1520 in accordance with examples as described herein, the device 1505 may support techniques for improved communication reliability, reduced latency, improved user experience related to reduced processing, reduced power consumption, more efficient utilization of communication resources, improved coordination between devices and improved utilization of processing capability.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for switching between CG modes as described herein, or the processor 1540 and the memory 1530 may be otherwise configured to perform or support such operations.

FIG. 16 shows a flowchart illustrating a method 1600 that supports techniques for switching between CG modes in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The operations of 1605 may be performed in accordance with examples as disclosed herein. In some examples, aspects of the operations of 1605 may be performed by a control signal component 1025 as described with reference to FIG. 10.

At 1610, the method may include transmitting one or more uplink messages to the base station in the unlicensed radio frequency spectrum band using the first set of parameters. The operations of 1610 may be performed in accordance with examples as disclosed herein. In some examples, aspects of the operations of 1610 may be performed by an uplink message component 1030 as described with reference to FIG. 10.

At 1615, the method may include receiving a control message including an indication that the UE is to switch from communicating according to the first configured UE operation mode to communicating according to the second configured UE operation mode. The operations of 1615 may be performed in accordance with examples as disclosed herein. In some examples, aspects of the operations of 1615 may be performed by an operation mode component 1035 as described with reference to FIG. 10.

At 1620, the method may include transmitting, in response to the received indication, one or more uplink messages to the base station in the unlicensed radio frequency spectrum band using the second set of parameters according to the second UE operation mode. The operations of 1620 may be performed in accordance with examples as disclosed herein. In some examples, aspects of the operations of 1620 may be performed by an uplink message component 1030 as described with reference to FIG. 10.

FIG. 17 shows a flowchart illustrating a method 1700 that supports techniques for switching between CG modes in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The operations of 1705 may be performed in accordance with examples as disclosed herein. In some examples, aspects of the operations of 1705 may be performed by a control signal component 1025 as described with reference to FIG. 10.

At 1710, the method may include receiving a first configuration indicating resources granted to the UE for communication in the unlicensed radio frequency spectrum band according to the first set of parameters, the first configuration of resources being associated with the first UE operation mode. The operations of 1710 may be performed in accordance with examples as disclosed herein. In some examples, aspects of the operations of 1710 may be performed by a configuration component 1040 as described with reference to FIG. 10.

At 1715, the method may include receiving a second configuration indicating resources granted to the UE for communication in the unlicensed radio frequency spectrum band according to the second set of parameters, the second configuration of resources being associated with the second UE operation mode. The operations of 1715 may be performed in accordance with examples as disclosed herein. In some examples, aspects of the operations of 1715 may be performed by a configuration component 1040 as described with reference to FIG. 10.

At 1720, the method may include transmitting one or more uplink messages to the base station in the unlicensed radio frequency spectrum band using the first set of parameters. The operations of 1720 may be performed in accordance with examples as disclosed herein. In some examples, aspects of the operations of 1720 may be performed by an uplink message component 1030 as described with reference to FIG. 10.

At 1725, the method may include receiving a control message including an indication that the UE is to switch from communicating according to the first configured UE operation mode to communicating according to the second configured UE operation mode. The operations of 1725 may be performed in accordance with examples as disclosed herein. In some examples, aspects of the operations of 1725 may be performed by an operation mode component 1035 as described with reference to FIG. 10.

At 1730, the method may include transmitting, in response to the received indication, one or more uplink messages to the base station in the unlicensed radio frequency spectrum band using the second set of parameters according to the second UE operation mode. The operations of 1730 may be performed in accordance with examples as disclosed herein. In some examples, aspects of the operations of 1730 may be performed by an uplink message component 1030 as described with reference to FIG. 10.

FIG. 18 shows a flowchart illustrating a method 1800 that supports techniques for switching between CG modes in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The operations of 1805 may be performed in accordance with examples as disclosed herein. In some examples, aspects of the operations of 1805 may be performed by a control signal component 1025 as described with reference to FIG. 10.

At 1810, the method may include transmitting one or more uplink messages to the base station in the unlicensed radio frequency spectrum band using the first set of parameters. The operations of 1810 may be performed in accordance with examples as disclosed herein. In some examples, aspects of the operations of 1810 may be performed by an uplink message component 1030 as described with reference to FIG. 10.

At 1815, the method may include determining an interference condition associated with uplink communications in the unlicensed radio frequency spectrum band The operations of 1815 may be performed in accordance with examples as disclosed herein. In some examples, aspects of the operations of 1815 may be performed by an interference condition component 1055 as described with reference to FIG. 10.

At 1820, the method may include transmitting, based on the interference condition satisfying a threshold, a second control message requesting an update to a UE operation mode from the first configured UE operation mode to the second configured UE operation mode. The operations of 1820 may be performed in accordance with examples as disclosed herein. In some examples, aspects of the operations of may be performed by an interference condition component 1055 as described with reference to FIG. 10.

At 1825, the method may include receiving a control message including an indication that the UE is to switch from communicating according to the first configured UE operation mode to communicating according to the second configured UE operation mode. The operations of 1825 may be performed in accordance with examples as disclosed herein. In some examples, aspects of the operations of 1825 may be performed by an operation mode component 1035 as described with reference to FIG. 10.

At 1830, the method may include transmitting, in response to the received indication, one or more uplink messages to the base station in the unlicensed radio frequency spectrum band using the second set of parameters according to the second UE operation mode. The operations of 1830 may be performed in accordance with examples as disclosed herein. In some examples, aspects of the operations of 1830 may be performed by an uplink message component 1030 as described with reference to FIG. 10.

FIG. 19 shows a flowchart illustrating a method 1900 that supports techniques for switching between CG modes in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The operations of 1905 may be performed in accordance with examples as disclosed herein. In some examples, aspects of the operations of 1905 may be performed by a control signal component 1025 as described with reference to FIG. 10.

At 1910, the method may include transmitting one or more uplink messages to the base station in the unlicensed radio frequency spectrum band using the first set of parameters. The operations of 1910 may be performed in accordance with examples as disclosed herein. In some examples, aspects of the operations of 1910 may be performed by an uplink message component 1030 as described with reference to FIG. 10.

At 1915, the method may include receiving a first configuration indicating resources granted to the UE for communication in the unlicensed radio frequency spectrum band according to the first set of parameters, the first configuration of resources being associated with the first UE operation mode. The operations of 1915 may be performed in accordance with examples as disclosed herein. In some examples, aspects of the operations of 1915 may be performed by a configuration component 1040 as described with reference to FIG. 10.

At 1920, the method may include receiving a second configuration indicating resources granted to the UE for communication in the unlicensed radio frequency spectrum band according to the second set of parameters, the second configuration of resources being associated with the second UE operation mode. The operations of 1920 may be performed in accordance with examples as disclosed herein. In some examples, aspects of the operations of 1920 may be performed by a configuration component 1040 as described with reference to FIG. 10.

At 1925, the method may include determining an interference condition associated with uplink communications in the unlicensed radio frequency spectrum band. The operations of 1925 may be performed in accordance with examples as disclosed herein. In some examples, aspects of the operations of 1925 may be performed by an interference condition component 1055 as described with reference to FIG. 10.

At 1930, the method may include transmitting, based on the interference condition satisfying a threshold, a second control message requesting an update to a UE operation mode from the first configured UE operation mode to the second configured UE operation mode. The operations of 1930 may be performed in accordance with examples as disclosed herein. In some examples, aspects of the operations of 1930 may be performed by an interference condition component 1055 as described with reference to FIG. 10.

At 1935, the method may include receiving a control message including an indication that the UE is to switch from communicating according to the first configured UE operation mode to communicating according to the second configured UE operation mode. The operations of 1935 may be performed in accordance with examples as disclosed herein. In some examples, aspects of the operations of 1935 may be performed by an operation mode component 1035 as described with reference to FIG. 10.

At 1940, the method may include transmitting, in response to the received indication, one or more uplink messages to the base station in the unlicensed radio frequency spectrum band using the second set of parameters according to the second UE operation mode. The operations of 1940 may be performed in accordance with examples as disclosed herein. In some examples, aspects of the operations of 1940 may be performed by an uplink message component 1030 as described with reference to FIG. 10.

FIG. 20 shows a flowchart illustrating a method 2000 that supports techniques for switching between CG modes in accordance with aspects of the present disclosure. The operations of the method 2000 may be implemented by a base station or its components as described herein. For example, the operations of the method 2000 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The operations of 2005 may be performed in accordance with examples as disclosed herein. In some examples, aspects of the operations of 2005 may be performed by a control signal component 1425 as described with reference to FIG. 14.

At 2010, the method may include receiving one or more uplink messages from the UE in the unlicensed radio frequency spectrum band using the first set of parameters. The operations of 2010 may be performed in accordance with examples as disclosed herein. In some examples, aspects of the operations of 2010 may be performed by an uplink message component 1430 as described with reference to FIG. 14.

At 2015, the method may include transmitting a control message including an indication that the UE is to switch from communicating according to the first configured UE operation mode to communicating according to the second configured UE operation mode. The operations of 2015 may be performed in accordance with examples as disclosed herein. In some examples, aspects of the operations of 2015 may be performed by an operation mode component 1435 as described with reference to FIG. 14.

At 2020, the method may include receiving, in response to the transmitted indication, one or more uplink messages from the UE in the unlicensed radio frequency spectrum band using the second set of parameters according to the second UE operation mode. The operations of 2020 may be performed in accordance with examples as disclosed herein. In some examples, aspects of the operations of 2020 may be performed by an uplink message component 1430 as described with reference to FIG. 14.

FIG. 21 shows a flowchart illustrating a method 2100 that supports techniques for switching between CG modes in accordance with aspects of the present disclosure. The operations of the method 2100 may be implemented by a base station or its components as described herein. For example, the operations of the method 2100 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The operations of 2105 may be performed in accordance with examples as disclosed herein. In some examples, aspects of the operations of 2105 may be performed by a control signal component 1425 as described with reference to FIG. 14.

At 2110, the method may include receiving one or more uplink messages from the UE in the unlicensed radio frequency spectrum band using the first set of parameters. The operations of 2110 may be performed in accordance with examples as disclosed herein. In some examples, aspects of the operations of 2110 may be performed by an uplink message component 1430 as described with reference to FIG. 14.

At 2115, the method may include receiving a request to update to a UE operation mode from the first configured UE operation mode to the second configured UE operation mode, where receiving the control message is at least in part in response to transmitting the request. The operations of 2115 may be performed in accordance with examples as disclosed herein. In some examples, aspects of the operations of 2115 may be performed by a request component 1445 as described with reference to FIG. 14.

At 2120, the method may include transmitting a control message including an indication that the UE is to switch from communicating according to the first configured UE operation mode to communicating according to the second configured UE operation mode. The operations of 2120 may be performed in accordance with examples as disclosed herein. In some examples, aspects of the operations of 2120 may be performed by an operation mode component 1435 as described with reference to FIG. 14.

At 2125, the method may include receiving, in response to the transmitted indication, one or more uplink messages from the UE in the unlicensed radio frequency spectrum band using the second set of parameters according to the second UE operation mode. The operations of 2125 may be performed in accordance with examples as disclosed herein. In some examples, aspects of the operations of 2125 may be performed by an uplink message component 1430 as described with reference to FIG. 14.

FIG. 22 shows a flowchart illustrating a method 2200 that supports techniques for switching between CG modes in accordance with aspects of the present disclosure. The operations of the method 2200 may be implemented by a base station or its components as described herein. For example, the operations of the method 2200 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The operations of 2205 may be performed in accordance with examples as disclosed herein. In some examples, aspects of the operations of 2205 may be performed by a control signal component 1425 as described with reference to FIG. 14.

At 2210, the method may include receiving one or more uplink messages from the UE in the unlicensed radio frequency spectrum band using the first set of parameters. The operations of 2210 may be performed in accordance with examples as disclosed herein. In some examples, aspects of the operations of 2210 may be performed by an uplink message component 1430 as described with reference to FIG. 14.

At 2215, the method may include transmitting a first configuration indicating resources granted to the UE for communication in the unlicensed radio frequency spectrum band according to the first set of parameters, the first configuration of resources being associated with the first UE operation mode. The operations of 2215 may be performed in accordance with examples as disclosed herein. In some examples, aspects of the operations of 2215 may be performed by a configuration component 1440 as described with reference to FIG. 14.

At 2220, the method may include transmitting a second configuration indicating resources granted to the UE for communication in the unlicensed radio frequency spectrum band according to the second set of parameters, the second configuration of resources being associated with the second UE operation mode. The operations of 2220 may be performed in accordance with examples as disclosed herein. In some examples, aspects of the operations of 2220 may be performed by a configuration component 1440 as described with reference to FIG. 14.

At 2225, the method may include transmitting a control message including an indication that the UE is to switch from communicating according to the first configured UE operation mode to communicating according to the second configured UE operation mode. The operations of 2225 may be performed in accordance with examples as disclosed herein. In some examples, aspects of the operations of 2225 may be performed by an operation mode component 1435 as described with reference to FIG. 14.

At 2230, the method may include receiving, in response to the transmitted indication, one or more uplink messages from the UE in the unlicensed radio frequency spectrum band using the second set of parameters according to the second UE operation mode. The operations of 2230 may be performed in accordance with examples as disclosed herein. In some examples, aspects of the operations of 2230 may be performed by an uplink message component 1430 as described with reference to FIG. 14.

FIG. 23 shows a flowchart illustrating a method 2300 that supports techniques for switching between CG modes in accordance with aspects of the present disclosure. The operations of the method 2300 may be implemented by a base station or its components as described herein. For example, the operations of the method 2300 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2305, the method may include transmitting, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band. The operations of 2305 may be performed in accordance with examples as disclosed herein. In some examples, aspects of the operations of 2305 may be performed by a control signal component 1425 as described with reference to FIG. 14.

At 2310, the method may include receiving one or more uplink messages from the UE in the unlicensed radio frequency spectrum band using the first set of parameters. The operations of 2310 may be performed in accordance with examples as disclosed herein. In some examples, aspects of the operations of 2310 may be performed by an uplink message component 1430 as described with reference to FIG. 14.

At 2315, the method may include transmitting a first configuration indicating resources granted to the UE for communication in the unlicensed radio frequency spectrum band according to the first set of parameters, the first configuration of resources being associated with the first UE operation mode. The operations of 2315 may be performed in accordance with examples as disclosed herein. In some examples, aspects of the operations of 2315 may be performed by a configuration component 1440 as described with reference to FIG. 14.

At 2320, the method may include transmitting a second configuration indicating resources granted to the UE for communication in the unlicensed radio frequency spectrum band according to the second set of parameters, the second configuration of resources being associated with the second UE operation mode. The operations of 2320 may be performed in accordance with examples as disclosed herein. In some examples, aspects of the operations of 2320 may be performed by a configuration component 1440 as described with reference to FIG. 14.

At 2325, the method may include receiving a request to update to a UE operation mode from the first configured UE operation mode to the second configured UE operation mode, where receiving the control message is at least in part in response to transmitting the request. The operations of 2325 may be performed in accordance with examples as disclosed herein. In some examples, aspects of the operations of 2325 may be performed by a request component 1445 as described with reference to FIG. 14.

At 2330, the method may include transmitting a control message including an indication that the UE is to switch from communicating according to the first configured UE operation mode to communicating according to the second configured UE operation mode. The operations of 2330 may be performed in accordance with examples as disclosed herein. In some examples, aspects of the operations of 2330 may be performed by an operation mode component 1435 as described with reference to FIG. 14.

At 2335, the method may include receiving, in response to the transmitted indication, one or more uplink messages from the UE in the unlicensed radio frequency spectrum band using the second set of parameters according to the second UE operation mode. The operations of 2335 may be performed in accordance with examples as disclosed herein. In some examples, aspects of the operations of 2335 may be performed by an uplink message component 1430 as described with reference to FIG. 14.

The following provides an overview of aspects of the present disclosure:

Aspect 1: A method for wireless communication at a UE, comprising: receiving, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band; transmitting one or more uplink messages to the base station in the unlicensed radio frequency spectrum band using the first set of parameters; receiving a control message comprising an indication that the UE is to switch from communicating according to the first configured UE operation mode to communicating according to the second configured UE operation mode; and transmitting, in response to the received indication, one or more uplink messages to the base station in the unlicensed radio frequency spectrum band using the second set of parameters according to the second UE operation mode.

Aspect 2: The method of aspect 1, wherein receiving the control signaling comprises: receiving a configuration indicating resources granted to the UE for communication in the unlicensed radio frequency spectrum band, the configuration associated with at least the first UE operation mode and the second UE operation mode.

Aspect 3: The method of any of aspects 1 through 2, wherein receiving the control signaling comprises: receiving a first configuration indicating resources granted to the UE for communication in the unlicensed radio frequency spectrum band according to the first set of parameters, the first configuration of resources being associated with the first UE operation mode; and receiving a second configuration indicating resources granted to the UE for communication in the unlicensed radio frequency spectrum band according to the second set of parameters, the second configuration of resources being associated with the second UE operation mode.

Aspect 4: The method of any of aspects 1 through 3, further comprising: transmitting a request to update to a UE operation mode from the first configured UE operation mode to the second configured UE operation mode, wherein receiving the control message is at least in part in response to transmitting the request.

Aspect 5: The method of aspect 4, wherein the request comprises at least a bit indicating a request to switch a UE operation mode, a bit field indicating an identity of a serving cell associated with the request, and a bit field indicating an identity of a bandwidth part associated with the request.

Aspect 6: The method of any of aspects 4 through 5, wherein the request comprises at least a bitmap indicating a request to switch a UE operation mode for each configuration of resources, a bit field indicating an identity of a serving cell associated with the request, and a bit field indicating an identity of a bandwidth part associated with the request.

Aspect 7: The method of any of aspects 1 through 6, further comprising: transmitting, to the base station, a feedback message in response to receiving the control message, the feedback message indicating that the UE is to switch from communicating according to the first configured UE operation mode to communicating according to the second configured UE operation mode.

Aspect 8: The method of aspect 7, wherein the feedback message is transmitted during a first time slot and the uplink messages using the second set of parameters according to the second UE operation mode are transmitted during a second time slot, the second time slot is at least a threshold number of time slots after the first time slot.

Aspect 9: The method of any of aspects 1 through 8, further comprising: determining an interference condition associated with uplink communications in the unlicensed radio frequency spectrum band; and transmitting, based at least in part on the interference condition satisfying a threshold, a second control message requesting an update to a UE operation mode from the first configured UE operation mode to the second configured UE operation mode.

Aspect 10: The method of any of aspects 1 through 9, wherein at least one of the first UE operation mode and the second UE operation mode is associated with a reconfiguration timer.

Aspect 11: The method of any of aspects 1 through 10, further comprising: receiving, from the base station, an indication of a default UE operation mode that comprises one of the first UE operation mode or the second UE operation mode.

Aspect 12: The method of any of aspects 1 through 11, wherein the indication of the control message comprises at least a bit indicating for the UE to switch a UE operation mode, a bit field indicating an identity of a serving cell associated with the UE operation mode switch, and a bit field indicating an identity of a bandwidth part associated with the UE operation mode switch.

Aspect 13: The method of any of aspects 1 through 12, wherein the indication of the control message comprises at least a bitmap indicating an operation mode switch for each configuration of resources, a bit field indicating an identity of a serving cell associated with the UE operation mode switch, and a bit field indicating an identity of a bandwidth part associated with the UE operation mode switch.

Aspect 14: The method of any of aspects 1 through 13, wherein the first UE operation mode comprises an ultra-reliable low-latency communication (URLLC) operation mode, and the second UE operation mode comprises a new radio (NR) in unlicensed spectrum (NR-U) operation mode.

Aspect 15: A method for wireless communication at a base station, comprising: transmitting, to a UE, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band; receiving one or more uplink messages from the UE in the unlicensed radio frequency spectrum band using the first set of parameters; transmitting a control message comprising an indication that the UE is to switch from communicating according to the first configured UE operation mode to communicating according to the second configured UE operation mode; and receiving, in response to the transmitted indication, one or more uplink messages from the UE in the unlicensed radio frequency spectrum band using the second set of parameters according to the second UE operation mode.

Aspect 16: The method of aspect 15, wherein transmitting the control signaling comprises: a configuration indicating resources granted to the UE for communication in the unlicensed radio frequency spectrum band, the configuration associated with at least the first UE operation mode and the second UE operation mode.

Aspect 17: The method of any of aspects 15 through 16, wherein transmitting the control signaling comprises: transmitting a first configuration indicating resources granted to the UE for communication in the unlicensed radio frequency spectrum band according to the first set of parameters, the first configuration of resources being associated with the first UE operation mode; and transmitting a second configuration indicating resources granted to the UE for communication in the unlicensed radio frequency spectrum band according to the second set of parameters, the second configuration of resources being associated with the second UE operation mode.

Aspect 18: The method of any of aspects 15 through 17, further comprising: receiving a request to update to a UE operation mode from the first configured UE operation mode to the second configured UE operation mode, wherein receiving the control message is at least in part in response to transmitting the request.

Aspect 19: The method of aspect 18, wherein the request comprises at least a bit indicating a request to switch a UE operation mode, a bitmap indicating a request to switch a UE operation mode for each configuration of resources, a bit field indicating an identity of a serving cell associated with the request, and a bit field indicating an identity of a bandwidth part associated with the request.

Aspect 20: The method of any of aspects 15 through 19, further comprising: receiving, from the UE, a feedback message in response to transmitting the control message, the feedback message indicating that the UE is to switch from communicating according to the first configured UE operation mode to communicating according to the second configured UE operation mode.

Aspect 21: The method of any of aspects 15 through 20, wherein at least one of the first UE operation mode and the second UE operation mode is associated with a reconfiguration timer.

Aspect 22: The method of any of aspects 15 through 21, further comprising: transmitting, to the UE, an indication of a default UE operation mode that comprises one of the first UE operation mode or the second UE operation mode.

Aspect 23: The method of any of aspects 15 through 22, wherein the indication of control message comprises at least a bit indicating for the UE to switch a UE operation mode, a bitmap indicating an operation mode switch for each configuration of resources, a bit field indicating an identity of a serving cell associated with the UE operation mode switch, and a bit field indicating an identity of a bandwidth part associated with the UE operation mode switch.

Aspect 24: An apparatus for wireless communication at a UE, comprising a processor; memory coupled with the processor; and instructions stored in the memory and executable by the processor to cause the apparatus to perform a method of any of aspects 1 through 14.

Aspect 25: An apparatus for wireless communication at a UE, comprising at least one means for performing a method of any of aspects 1 through 14.

Aspect 26: A non-transitory computer-readable medium storing code for wireless communication at a UE, the code comprising instructions executable by a processor to perform a method of any of aspects 1 through 14.

Aspect 27: An apparatus for wireless communication at a base station, comprising a processor; memory coupled with the processor; and instructions stored in the memory and executable by the processor to cause the apparatus to perform a method of any of aspects 15 through 23.

Aspect 28: An apparatus for wireless communication at a base station, comprising at least one means for performing a method of any of aspects 15 through 23.

Aspect 29: A non-transitory computer-readable medium storing code for wireless communication at a base station, the code comprising instructions executable by a processor to perform a method of any of aspects 15 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band;

transmitting one or more uplink messages to the base station in the unlicensed radio frequency spectrum band using the first set of parameters;

receiving a control message comprising an indication that the UE is to switch from communicating according to the first configured UE operation mode to communicating according to the second configured UE operation mode; and transmitting, in response to the received indication, one or more uplink messages to the base station in the unlicensed radio frequency spectrum band using the second set of parameters according to the second UE operation mode.

2. The method of claim 1, wherein receiving the control signaling comprises:

receiving a configuration indicating resources granted to the UE for communication in the unlicensed radio frequency spectrum band, the configuration associated with at least the first UE operation mode and the second UE operation mode.

3. The method of claim 1, wherein receiving the control signaling comprises:

receiving a first configuration indicating resources granted to the UE for communication in the unlicensed radio frequency spectrum band according to the first set of parameters, the first configuration of resources being associated with the first UE operation mode; and receiving a second configuration indicating resources granted to the UE for communication in the unlicensed radio frequency spectrum band according to the second set of parameters, the second configuration of resources being associated with the second UE operation mode.

4. The method of claim 1, further comprising:

transmitting a request to update to a UE operation mode from the first configured UE operation mode to the second configured UE operation mode, wherein receiving the control message is at least in part in response to transmitting the request.

5. The method of claim 4, wherein the request comprises at least a bit indicating a request to switch a UE operation mode, a bit field indicating an identity of a serving cell associated with the request, and a bit field indicating an identity of a bandwidth part associated with the request.

6. The method of claim 4, wherein the request comprises at least a bitmap indicating a request to switch a UE operation mode for each configuration of resources, a bit field indicating an identity of a serving cell associated with the request, and a bit field indicating an identity of a bandwidth part associated with the request.

7. The method of claim 1, further comprising:
transmitting, to the base station, a feedback message in response to receiving the control message, the feedback message indicating that the UE is to switch from communicating according to the first configured UE operation mode to communicating according to the second configured UE operation mode.

8. The method of claim 7, wherein
the feedback message is transmitted during a first time slot and the uplink messages using the second set of parameters according to the second UE operation mode are transmitted during a second time slot,
the second time slot is at least a threshold number of time slots after the first time slot.

9. The method of claim 1, further comprising:
determining an interference condition associated with uplink communications in the unlicensed radio frequency spectrum band; and
transmitting, based at least in part on the interference condition satisfying a threshold, a second control message requesting an update to a UE operation mode from the first configured UE operation mode to the second configured UE operation mode.

10. The method of claim 1, wherein at least one of the first UE operation mode and the second UE operation mode is associated with a reconfiguration timer.

11. The method of claim 1, further comprising:
receiving, from the base station, an indication of a default UE operation mode that comprises one of the first UE operation mode or the second UE operation mode.

12. The method of claim 1, wherein the indication of the control message comprises at least a bit indicating for the UE to switch a UE operation mode, a bit field indicating an identity of a serving cell associated with the UE operation mode switch, and a bit field indicating an identity of a bandwidth part associated with the UE operation mode switch.

13. The method of claim 1, wherein the indication of the control message comprises at least a bitmap indicating an operation mode switch for each configuration of resources, a bit field indicating an identity of a serving cell associated with the UE operation mode switch, and a bit field indicating an identity of a bandwidth part associated with the UE operation mode switch.

14. The method of claim 1, wherein the first UE operation mode comprises an ultra-reliable low-latency communication (URLLC) operation mode, and the second UE operation mode comprises a new radio (NR) in unlicensed spectrum (NR-U) operation mode.

15. A method for wireless communication at a base station, comprising:
transmitting, to a user equipment (UE), control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band;
receiving one or more uplink messages from the UE in the unlicensed radio frequency spectrum band using the first set of parameters;
transmitting a control message comprising an indication that the UE is to switch from communicating according to the first configured UE operation mode to communicating according to the second configured UE operation mode; and
receiving, in response to the transmitted indication, one or more uplink messages from the UE in the unlicensed radio frequency spectrum band using the second set of parameters according to the second UE operation mode.

16. The method of claim 15, wherein transmitting the control signaling comprises:
a configuration indicating resources granted to the UE for communication in the unlicensed radio frequency spectrum band, the configuration associated with at least the first UE operation mode and the second UE operation mode.

17. The method of claim 15, wherein transmitting the control signaling comprises:
transmitting a first configuration indicating resources granted to the UE for communication in the unlicensed radio frequency spectrum band according to the first set of parameters, the first configuration of resources being associated with the first UE operation mode; and
transmitting a second configuration indicating resources granted to the UE for communication in the unlicensed radio frequency spectrum band according to the second set of parameters, the second configuration of resources being associated with the second UE operation mode.

18. The method of claim 15, further comprising:
receiving a request to update to a UE operation mode from the first configured UE operation mode to the second configured UE operation mode, wherein transmitting the control message is at least in part in response to receiving the request.

19. The method of claim 18, wherein the request comprises at least a bit indicating a request to switch a UE operation mode, a bitmap indicating a request to switch a UE operation mode for each configuration of resources, a bit field indicating an identity of a serving cell associated with the request, and a bit field indicating an identity of a bandwidth part associated with the request.

20. The method of claim 15, further comprising:
receiving, from the UE, a feedback message in response to transmitting the control message, the feedback message indicating that the UE is to switch from communicating according to the first configured UE operation mode to communicating according to the second configured UE operation mode.

21. The method of claim 15, wherein at least one of the first UE operation mode and the second UE operation mode is associated with a reconfiguration timer.

22. The method of claim 15, further comprising:
transmitting, to the UE, an indication of a default UE operation mode that comprises one of the first UE operation mode or the second UE operation mode.

23. The method of claim 15, wherein the indication of control message comprises at least a bit indicating for the UE to switch a UE operation mode, a bitmap indicating an operation mode switch for each configuration of resources, a bit field indicating an identity of a serving cell associated with the UE operation mode switch, and a bit field indicating an identity of a bandwidth part associated with the UE operation mode switch.

24. An apparatus for wireless communication at a user equipment (UE), comprising:

a processor;

memory coupled with the processor; and instructions stored in the memory and executable by the processor to cause the apparatus to:

receive, from a base station, control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band;

transmit one or more uplink messages to the base station in the unlicensed radio frequency spectrum band using the first set of parameters;

receive a control message comprising an indication that the UE is to switch from communicating according to the first configured UE operation mode to communicating according to the second configured UE operation mode; and transmit, in response to the received indication, one or more uplink messages to the base station in the unlicensed radio frequency spectrum band using the second set of parameters according to the second UE operation mode.

25. The apparatus of claim 24, wherein the instructions to receive the control signaling are executable by the processor to cause the apparatus to:

receive a configuration indicating resources granted to the UE for communication in the unlicensed radio frequency spectrum band, the configuration associated with at least the first UE operation mode and the second UE operation mode.

26. The apparatus of claim 24, wherein the instructions to receive the control signaling are executable by the processor to cause the apparatus to:

receive a first configuration indicating resources granted to the UE for communication in the unlicensed radio frequency spectrum band according to the first set of parameters, the first configuration of resources being associated with the first UE operation mode; and receive a second configuration indicating resources granted to the UE for communication in the unlicensed radio frequency spectrum band according to the second set of parameters, the second configuration of resources being associated with the second UE operation mode.

27. The apparatus of claim 24, wherein the instructions are further executable by the processor to cause the apparatus to:

transmit a request to update to a UE operation mode from the first configured UE operation mode to the second configured UE operation mode, wherein receiving the control message is at least in part in response to transmitting the request.

28. The apparatus of claim 27, wherein the request comprises at least a bit indicating a request to switch a UE operation mode, a bit field indicating an identity of a serving cell associated with the request, and a bit field indicating an identity of a bandwidth part associated with the request.

29. An apparatus for wireless communication at a base station, comprising:

a processor;

memory coupled with the processor; and instructions stored in the memory and executable by the processor to cause the apparatus to:

transmit, to a user equipment (UE), control signaling configuring at least a first UE operation mode and a second UE operation mode, the first UE operation mode indicating a first set of parameters for the UE to use for uplink communications in an unlicensed radio frequency spectrum band, and the second UE operation mode indicating a second set of parameters for the UE to use for uplink communications in the unlicensed radio frequency spectrum band;

receive one or more uplink messages from the UE in the unlicensed radio frequency spectrum band using the first set of parameters;

transmit a control message comprising an indication that the UE is to switch from communicating according to the first configured UE operation mode to communicating according to the second configured UE operation mode; and receive, in response to the transmitted indication, one or more uplink messages from the UE in the unlicensed radio frequency spectrum band using the second set of parameters according to the second UE operation mode.

30. The apparatus of claim 29, wherein the instructions to transmit the control signaling are executable by the processor to cause the apparatus to:

a configuration indicate resources granted to the UE for communication in the unlicensed radio frequency spectrum band, the configuration associated with at least the first UE operation mode and the second UE operation mode, configuration of resources, a bit field indicating an identity of a serving cell associated with the UE operation mode switch, and a bit field indicating an identity of a bandwidth part associated with the UE operation mode switch.

* * * * *